United States Patent
Shin et al.

(10) Patent No.: US 10,371,568 B2
(45) Date of Patent: Aug. 6, 2019

(54) ACOUSTIC SENSOR AND HOME APPLIANCE SYSTEM COMPRISING THE SAME

(71) Applicant: LG ELECTRONICS INC., Seoul (KR)

(72) Inventors: Taedong Shin, Seoul (KR); Lagyoung Kim, Seoul (KR); Jihyun Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 128 days.

(21) Appl. No.: 15/458,523

(22) Filed: Mar. 14, 2017

(65) Prior Publication Data

US 2017/0268924 A1 Sep. 21, 2017

(30) Foreign Application Priority Data

Mar. 15, 2016 (KR) ........................ 10-2016-0031045

(51) Int. Cl.
*G01H 11/00* (2006.01)
*F24F 11/30* (2018.01)
(Continued)

(52) U.S. Cl.
CPC ............ *G01H 11/00* (2013.01); *A47L 9/2894* (2013.01); *D06F 33/02* (2013.01); *F24F 11/30* (2018.01); *F25D 29/008* (2013.01); *G01H 3/10* (2013.01); *G01V 8/10* (2013.01); *G08B 1/08* (2013.01); *G08B 21/187* (2013.01); *A47L 2201/00* (2013.01); *D06F 39/005* (2013.01); *D06F 39/14* (2013.01); *D06F 2202/12* (2013.01); *D06F 2204/10* (2013.01); *D06F 2210/00* (2013.01); *D06F 2212/06* (2013.01); *D06F 2216/00* (2013.01); *D06F 2224/00* (2013.01); *F24F 2110/00* (2018.01); *F24F 2130/40* (2018.01); *F25D 2700/02* (2013.01); *G01V 8/12* (2013.01); *G08B 13/1672* (2013.01); *G08B 13/187* (2013.01); *G08B 17/00* (2013.01); *G08B 21/02* (2013.01); *G08B 21/0208* (2013.01);
(Continued)

(58) Field of Classification Search
CPC ............ G01N 29/4409; G01N 29/4454; D06F 2224/00; F24F 11/30; F25D 2700/02; F25D 29/008
See application file for complete search history.

(56) References Cited

U.S. PATENT DOCUMENTS 4,952,766 A * 8/1990 McDonald ............. H05B 6/687
219/506
5,774,529 A * 6/1998 Johannsen ........... H04M 11/002
340/870.02
(Continued)

*Primary Examiner* — Natalie Huls
(74) *Attorney, Agent, or Firm* — Ked & Associates LLP

(57) ABSTRACT

Provided are an acoustic sensor and a home appliance system comprising the same. The acoustic sensor comprises a communication unit, a microphone to collect an acoustic signal, a memory to store a failure acoustic signal of a home appliance, and a processor, wherein in response to the acoustic signal, collected by the microphone, corresponding to the failure acoustic signal of the home appliance, the processor transmits the collected acoustic signal, or data corresponding to the collected acoustic signal, to an external server or a terminal. Accordingly, failure of the home appliance may be easily diagnosed.

18 Claims, 33 Drawing Sheets

(51) Int. Cl.
*G08B 13/16* (2006.01)
*G08B 17/00* (2006.01)
*D06F 33/02* (2006.01)
*A47L 9/28* (2006.01)
*G01V 8/10* (2006.01)
*G08B 21/18* (2006.01)
*F25D 29/00* (2006.01)
*G01H 3/10* (2006.01)
*G08B 1/08* (2006.01)
*D06F 39/00* (2006.01)
*G10L 25/51* (2013.01)
*G01V 8/12* (2006.01)
*G08B 13/187* (2006.01)
*G08B 21/02* (2006.01)
*G08B 21/04* (2006.01)
*G08B 29/18* (2006.01)
*F24F 110/00* (2018.01)
*F24F 130/40* (2018.01)
*D06F 39/14* (2006.01)

(52) U.S. Cl.
CPC ........ *G08B 21/043* (2013.01); *G08B 21/0469* (2013.01); *G08B 29/183* (2013.01); *G10L 25/51* (2013.01)

(56) References Cited

U.S. PATENT DOCUMENTS

| | | | | |
|---|---|---|---|---|
| 5,987,105 | A * | 11/1999 | Jenkins | G08B 13/1418 340/679 |
| 6,236,025 | B1 * | 5/2001 | Berkcan | G05D 23/27535 219/483 |
| 9,544,965 | B1 * | 1/2017 | O'Neil | H04W 4/70 |
| 2005/0086979 | A1 * | 4/2005 | Son | D06F 39/005 68/3 R |
| 2006/0044133 | A1 * | 3/2006 | Lou | F24C 7/08 340/531 |
| 2008/0025477 | A1 * | 1/2008 | Farhan | G06Q 50/22 379/38 |
| 2008/0036619 | A1 * | 2/2008 | Rhodes | G06F 13/4278 340/4.32 |
| 2009/0251310 | A1 * | 10/2009 | Bloebaum | G08B 21/0208 340/539.11 |
| 2009/0323914 | A1 * | 12/2009 | Lee | H04L 12/2825 379/106.01 |
| 2010/0032430 | A1 * | 2/2010 | Olsson | F24C 7/082 219/706 |
| 2011/0074589 | A1 * | 3/2011 | Han | H04L 12/2825 340/618 |
| 2011/0170377 | A1 * | 7/2011 | Legaspi | G08B 17/00 367/199 |
| 2014/0055261 | A1 * | 2/2014 | Su | G08B 17/10 340/532 |
| 2014/0188463 | A1 * | 7/2014 | Noh | G10L 15/00 704/201 |
| 2015/0253793 | A1 * | 9/2015 | Matesa, Jr. | G05B 15/02 700/297 |
| 2015/0336786 | A1 * | 11/2015 | Gardner | B67D 1/1243 222/1 |
| 2016/0022086 | A1 * | 1/2016 | Yuan | G10L 25/51 700/94 |
| 2016/0171880 | A1 * | 6/2016 | Wu | G05B 15/02 398/106 |
| 2016/0205973 | A1 * | 7/2016 | An | A23L 1/0255 |
| 2016/0226676 | A1 * | 8/2016 | Shin | H04B 11/00 |
| 2016/0267910 | A1 * | 9/2016 | Lee | G10L 15/22 |
| 2017/0075648 | A1 * | 3/2017 | Sun | H04L 12/2816 |
| 2017/0078109 | A1 * | 3/2017 | Han | H04L 12/2816 |
| 2017/0078110 | A1 * | 3/2017 | Han | H04L 41/22 |
| 2017/0211874 | A1 * | 7/2017 | Kim | F25D 23/025 |
| 2018/0120019 | A1 * | 5/2018 | Kim | F25D 23/02 |
| 2018/0156535 | A1 * | 6/2018 | Kim | F25D 23/02 |
| 2018/0189027 | A1 * | 7/2018 | Jeon | A47F 3/0434 |

* cited by examiner

200a

200b

200c

ACOUSTIC SENSOR AND HOME APPLIANCE SYSTEM COMPRISING THE SAME

CROSS-REFERENCE TO RELATED APPLICATION

This application claims the priority benefit of Korean Patent Application No. 10-2016-0031045, filed on 15 Mar. 2016 in the Korean Intellectual Property Office, the disclosure of which is incorporated herein by reference.

BACKGROUND OF THE INVENTION

1. Field of the Invention

The present invention relates to an acoustic sensor and a home appliance system comprising the same, and more particularly, to an acoustic sensor and a home appliance system comprising the same, in which the acoustic sensor may enable easy diagnosis of failure of a home appliance.

2. Description of the Related Art

Among home appliances installed in a building for users, a refrigerator stores food, a washing machine washes laundry, an air conditioner controls indoor temperature, and a cooking device cooks food, and the like.

With the development of various communication schemes, research has been conducted on many methods to improve user convenience in using these home appliances.

SUMMARY OF THE INVENTION

The present invention provides an acoustic sensor and a home appliance system comprising the same, in which the acoustic sensor may enable easy diagnosis of failure of a home appliance.

In accordance with an aspect of the present invention, the above and other objects can be accomplished by the provision of an acoustic sensor comprising a communication unit, a microphone to collect an acoustic signal, a memory to store a failure acoustic signal of a home appliance, and a processor, wherein in response to the acoustic signal, collected by the microphone, corresponding to the failure acoustic signal of the home appliance, the processor transmits the collected acoustic signal, or data corresponding to the collected acoustic signal, to an external server or a terminal.

According to another aspect of the present invention, there is provided a home appliance system comprising a home appliance, an acoustic sensor attached to the home appliance or disposed near the home appliance, and a server, wherein in response to a failure acoustic signal of the home appliance being collected by the acoustic sensor, the server receives the failure acoustic signal of the home appliance, or data corresponding to the failure acoustic signal of the home appliance, from the acoustic sensor.

DETAILED DESCRIPTION OF THE PREFERRED EMBODIMENTS

Hereinafter, embodiments of the present invention will be described in detail with reference to the accompanying drawings.

In the following description, the terms "module" and "unit", which are used herein to signify components, are merely intended to facilitate explanation of the present invention, and the terms do not have any distinguishable difference in meaning or role. Thus, the terms "module" and "unit" can be used interchangeably.

Figure 1:
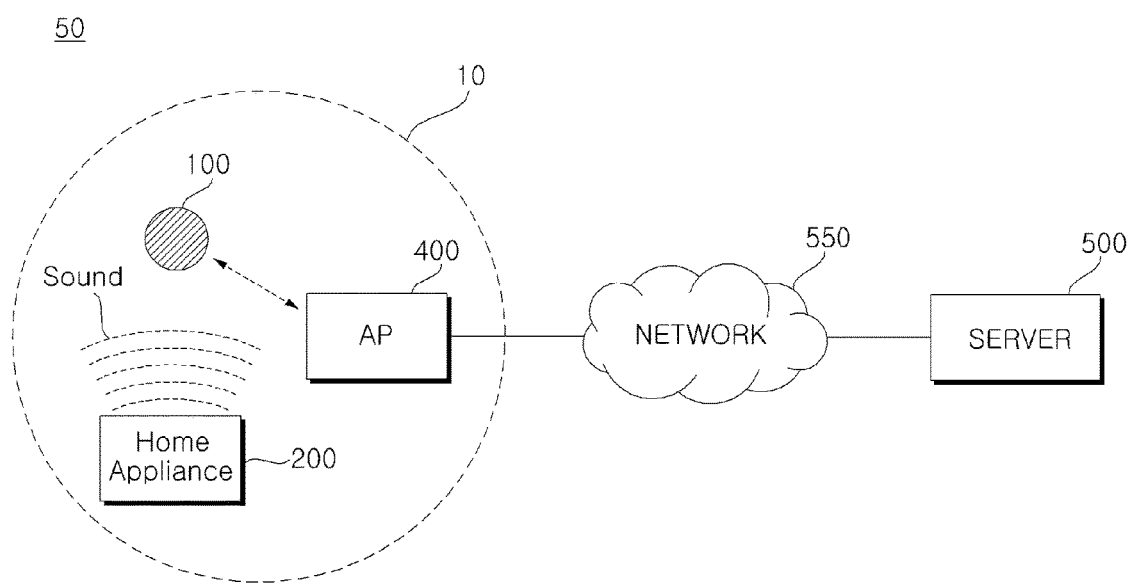
FIG. 1 is a diagram illustrating a structure of a home appliance system according to an embodiment of the present invention.

FIG. 1 is a diagram illustrating a structure of a home appliance system according to an embodiment of the present invention.

Referring to FIG. 1, the communication system 50 according to an embodiment of the present invention comprises a home appliance 200, an Access Point (AP) device 400, a server 500, and a network 550. In addition, the communication system 50 may further comprise a terminal (not shown).

The terminal 600 may be a mobile terminal, such as a cellular phone, a smart phone, a tablet PC, a wearable device, and the like, or a fixed terminal, such as a monitor, television, and the like.

The home appliance 200 is an electric device for a user, and examples thereof comprise a refrigerator 200a (in FIG. 2), a washing machine 200b (in FIG. 2), an air conditioner 200C (in FIG. 2), a cooking device 200d (in FIG. 2), a robot cleaner 200e (in FIG. 2), and the like.

The home appliance 200 comprises a sound output unit 247 (in FIG. 3), and in the event of failure, the home appliance 200 may output an acoustic signal through the sound output unit 247 for failure diagnosis.

The Access Point (AP) device 400 may provide an internal network 10 to a nearby electric device. Particularly, the AP device 400 may provide a wireless network.

Further, the AP device 400 may exchange data with the acoustic sensor 100 in the internal network 10. That is, the AP device 400 may allocate wireless channels to a plurality of acoustic sensors 100 using a specific communication scheme, and may perform wireless communication through the wireless channels. The communication scheme may be WiFi communication, ZigBee communication, or Bluetooth communication.

The mobile terminal (not shown) installed in the internal network 10 may receive an acoustic signal or data from the acoustic sensor 100 via the AP device 40, and based on the received acoustic signal or data, the mobile terminal may monitor the home appliance 200 and the like.

Moreover, the AP device 400 may perform data communication with an external electronic device through an external network 550 in addition to the internal network 10.

For example, the AP device 400 may perform wireless data communication with the mobile terminal (not shown), which is located at an external position, through the external network 550.

In this case, the mobile terminal (not shown) located in the external network 550 may receive an acoustic signal or data from the acoustic sensor 100 through the external network 550 and the AP device 400, and based on the received acoustic signal or data, the mobile terminal may monitor the home appliance 200 and the like.

In another example, the AP device 400 may perform wireless data communication with the server 500, which is located at an external position, through the external network 550.

The server 500 may be a web server that is operated by a manufacturer of the home appliance.

The server 500 may receive an acoustic signal or data from the acoustic sensor 100, and based on the received acoustic signal or data, the server 500 may monitor the home appliance 200 and the like.

Further, the server 500 may comprise a speech recognition algorithm. Upon receiving sound data from the acoustic sensor 100, the server 500 may convert the received sound data into text-format data, and may transmit the text-format data to the acoustic sensor 100.

The home appliance system 50 according to an embodiment of the present invention comprises: the home appliance 200; the acoustic sensor 100 which is attached to the home appliance 200, or is disposed near the home appliance 200; and the server 500, in which in the case where the acoustic sensor 100 collects a failure acoustic signal of the home appliance 200, the server 500 receives the collected acoustic signal, or data corresponding to the collected acoustic signal. Accordingly, by using the acoustic sensor 100, failure of the home appliance may be easily diagnosed.

In this manner, there is no need to provide a separate communication unit for the home appliance 20, such that failure may be diagnosed easily by using the acoustic sensor 100.

In the case where the acoustic signal, collected by the acoustic sensor 100, corresponds to a failure acoustic signal of the home appliance 200, the server 500 may determine that the home appliance 20 has broken down, based on the failure acoustic signal of the home appliance 200.

Further, in the case where the acoustic signal, collected by the acoustic sensor 100, corresponds to an operation acoustic signal of the home appliance 200, the server 500 may receive the collected acoustic signal, or data corresponding to the collected acoustic signal, from the acoustic sensor 100.

In addition, in the case where the acoustic signal, collected by the acoustic sensor 100, corresponds to an operation acoustic signal of the home appliance 200, the server 500 may determine an operation state of the home appliance 200 based on the operation acoustic signal of the home appliance 200.

Moreover, in the case where the door of the home appliance 200 is opened or closed while the acoustic sensor 100 is attached to the home appliance 200, the server 500 may receive a door opening or closing acoustic signal collected by the acoustic sensor 100, or data corresponding to the door opening or closing acoustic signal, from the acoustic sensor 100.

In addition, in the case where the acoustic signal, collected by the acoustic sensor 100, corresponds to the door opening or closing acoustic signal of the home appliance 200, the server 500 determines the opening or closing of the door of the home appliance 200 based on the door opening or closing acoustic signal of the home appliance 200.

Further, in the case where a moving object is detected based on output infrared light, which is output from the sensor unit 120, and received infrared light, which is received by the sensor unit 120, the server 500 may receive a warning signal from the acoustic sensor 100. In response to the warning signal, the server 500 may transmit a predetermined sound to the acoustic sensor 100.

The acoustic sensor 100 according to an embodiment of the present invention comprises: a communication unit 135; a microphone 110 which collects an acoustic signal; a memory 140 which stores a failure acoustic signal of the home appliance 200; and a processor 170, in which in the case where an acoustic signal, collected by the microphone 110, corresponds to the failure acoustic signal of the home appliance 200, the processor 170 transmits the collected acoustic signal, or data corresponding to the collected acoustic signal, to an external server 500 or a terminal. In this manner, failure of the home appliance may be easily diagnosed, thereby improving user convenience in using the home appliance.

In the case where an acoustic signal, collected by the microphone 110, corresponds to the failure acoustic signal of the home appliance 200, the acoustic sensor 100 may determine that the home appliance 200 has broken down, based on the failure acoustic signal of the home appliance 200.

Further, in the case where an acoustic signal, collected by the microphone 110, corresponds to an operation acoustic signal of the home appliance 200, the acoustic sensor 100 may transmit the collected acoustic signal, or data corresponding to the collected acoustic signal, to the external server 500 or the terminal.

Moreover, in the case where an acoustic signal, collected by the microphone 110, corresponds to an operation acoustic signal of the home appliance 200, the acoustic sensor 100 may determine an operation state based on the operation acoustic signal of the home appliance 200.

Further, the door of the home appliance 200 is opened or closed while the acoustic sensor 100 is attached to the home appliance 200, the acoustic sensor 100 may transmit a door opening or closing acoustic signal collected by the microphone 110, or data corresponding to the door opening or closing acoustic signal, to the external server 500 or the terminal.

In addition, in the case where an acoustic signal, collected by the microphone 110, corresponds to the door opening or closing acoustic signal of the home appliance 200, the acoustic sensor 100 may determine the opening of closing of the door of the home appliance 200 based on the door opening or closing acoustic signal of the home appliance 200.

Further, in the case where an acoustic signal, indicating an operation mode input for a specific home appliance 200, is input through the microphone 110, the acoustic sensor 100 may enter an operation mode for the home appliance 200.

In the case where the acoustic signal, collected by the microphone 110, is at a reference level or higher, the acoustic sensor 100 may activate the sensor unit 120 which is in an inactive state, such that power consumption may be reduced.

Further, in the case where a moving object is detected based on the output infrared light output from the sensor unit 120, and the received infrared light received by the sensor unit 120, the acoustic sensor 100 may transmit a warning signal to the external server 500 or to the terminal. In this manner, unmanned security may be provided by using the acoustic sensor 100.

Moreover, the acoustic sensor 100 may output sound, received through the communication unit 135, via the sound output unit.

Unlike FIG. 1, the server 500 illustrated in FIG. 1 may also be a server which is disposed in the internal network 10 and is located inside a building, i.e., a home server. In this case, the server may be mounted in the refrigerator 200a (in FIG. 2).

FIGS. 2A to 2E are diagrams illustrating various examples of a home appliance.

Figure 2A:
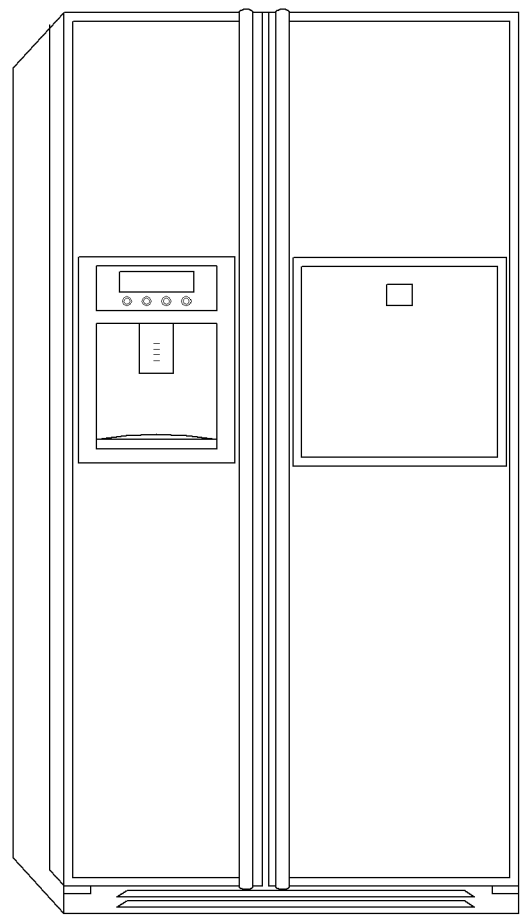
FIGS. 2A to 2E are diagrams illustrating various examples of a home appliance.
Figure 2B:
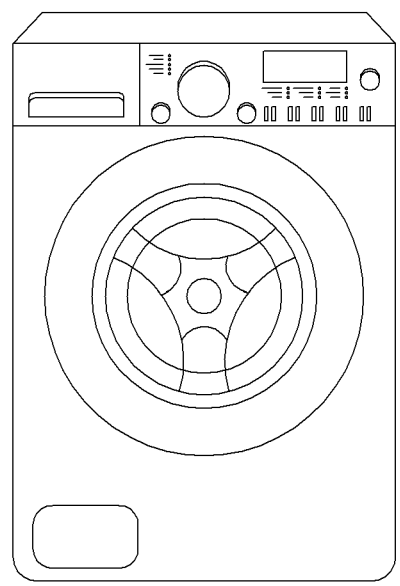
Figure 2C:
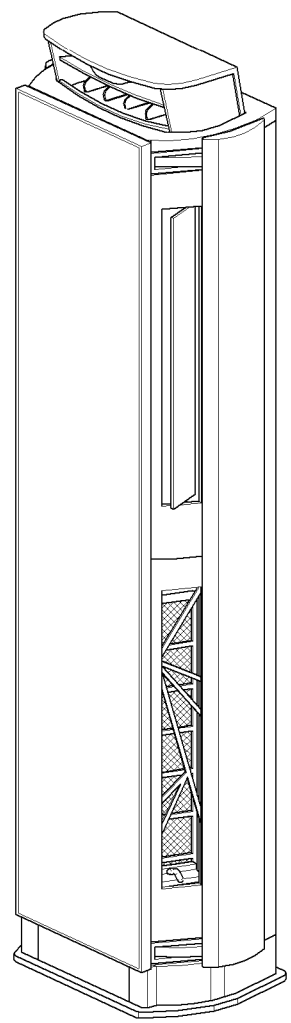
Figure 2D:
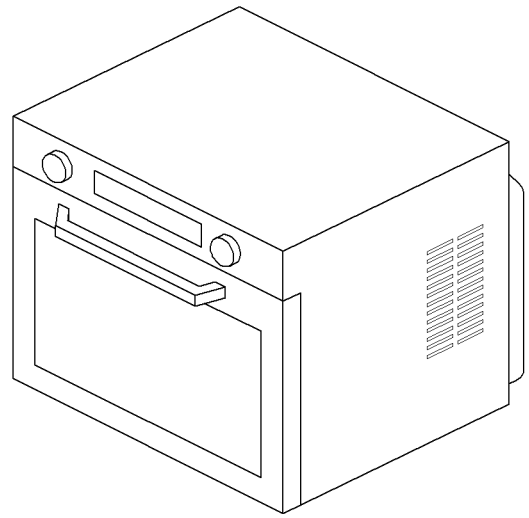
Figure 2E:
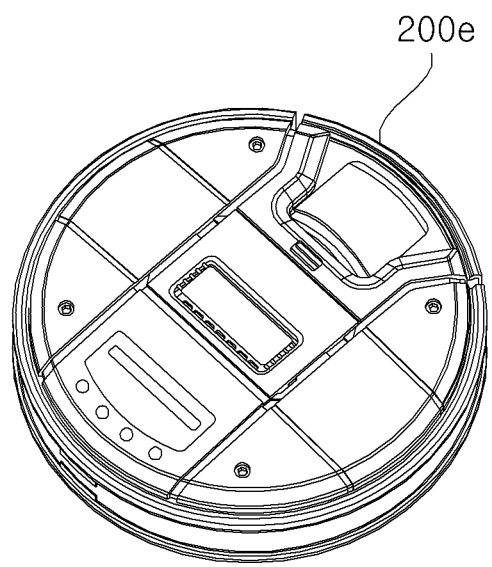

FIG. 2A illustrates an example of a refrigerator 200a; FIG. 2B illustrates an example of a washing machine 200b; FIG. 2C illustrates an example of an air conditioner 200C; FIG. 2D illustrates an example of a cooking device 200d; and FIG. 2E illustrates an example of a robot cleaner 200e.

In addition to the above home appliances, examples of the home appliance may comprise an air purifier, a dryer, a temperature control system, TV, and the like.

Figure 3:
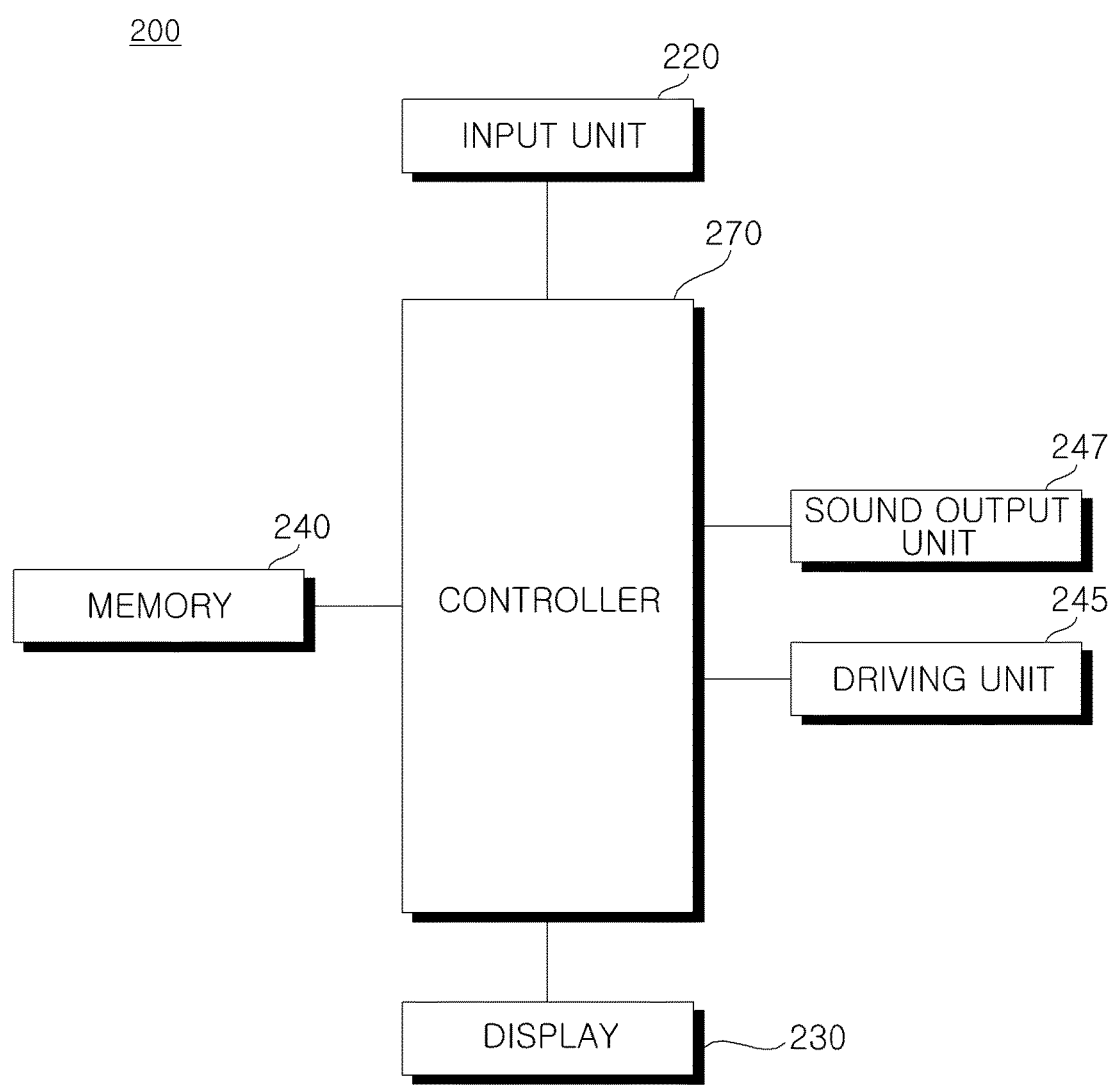
FIG. 3 is a block diagram illustrating an internal structure of the home appliance system illustrated in FIG. 1.

FIG. 3 is a block diagram illustrating an internal structure of the home appliance system illustrated in FIG. 1.

Referring to FIG. 3, the home appliance 200 comprises: an input unit 220 for user input; a display 230 to display an operation state of a home appliance and the like; a driving unit 245 to operate a home appliance; a sound output unit 247; and a controller 270 to control the internal operation.

For example, in the case where a home appliance is a refrigerator, the driving unit 245 may comprise: a fridge driving unit to operate a fridge fan to supply cooled air to a fridge; a freezer driving unit to operate a freezer fan to supply cooled air to a fridge; and a compressor driving unit to operate a compressor to compress a refrigerant.

In another example, in the case where a home appliance is a washing machine, the driving unit 245 may comprise a driving unit to operate a drum or a tub.

In yet another example, in the case where a home appliance is an air conditioner, the driving unit 245 may comprise: a compressor driving unit to operate a compressor in an outdoor unit of the air conditioner; an outdoor fan driving unit to operate an outdoor fan for heat exchange; and an indoor fan driving unit to operate an indoor fan for heat exchange.

In still another example, in the case where a home appliance is a cooking device, the driving unit 245 may comprise a microwave driving unit to output microwaves into a cavity.

In yet another example, in the case where a home appliance is a cleaner, the driving unit 245 may comprise a fan motor driving unit to suction air.

In the event of failure, the sound output unit 247 may output an acoustic signal for failure diagnosis.

To this end, the controller 270 may output different acoustic signals for each failure. Further, depending on the types of home appliances, failure acoustic signals may be different.

In addition, a memory 240 may be further comprised to store data of a home appliance.

Figure 4:
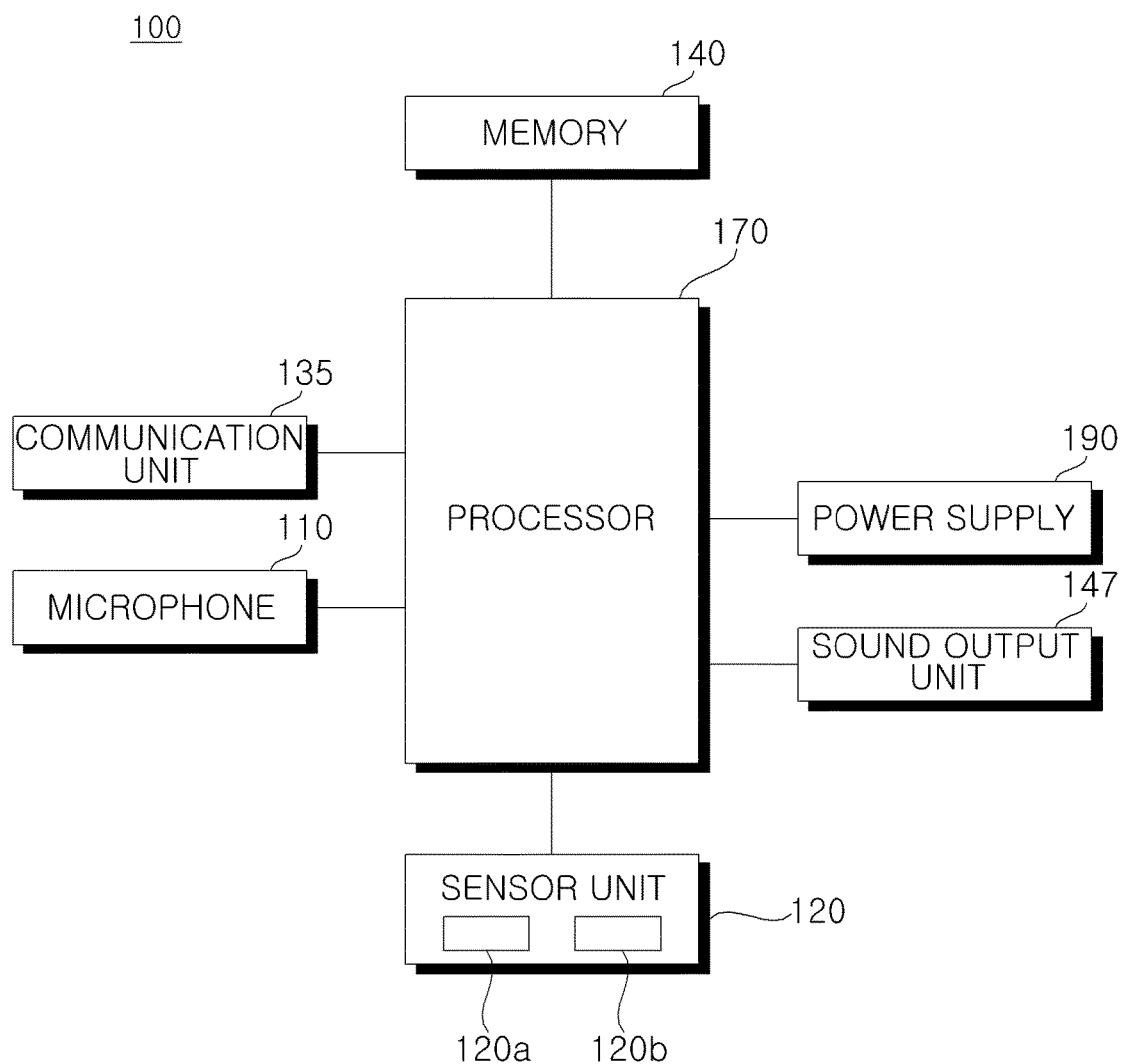
FIG. 4 is a block diagram illustrating an internal structure of an acoustic sensor illustrated in FIG. 1.

FIG. 4 is a block diagram illustrating an internal structure of an acoustic sensor illustrated in FIG. 1.

Referring to FIG. 4, the acoustic sensor 100 comprises a microphone 110, a sensor unit 120, a communication unit 135, a memory 140, a sound output unit 147, a processor 170, a display 180, and a power supply 190.

The microphone 110 may be provided as a plurality of microphones, and may collect acoustic signals.

The sensor unit 120 may output infrared light, and may receive light corresponding to the output infrared light.

To this end, the sensor unit 120 may comprise a transmitter 120a which outputs infrared light, and a receiver 120b which receives infrared light corresponding to the output infrared light.

The processor 170 may detect the presence of an external object, the movement of an object, and the like, based on a phase difference between the output infrared light and the received infrared light. Particularly, when a thief breaks into the house, the processor 170 may detect the movement of the thief, and may transmit a warning signal to the external server 500 or a mobile terminal (not shown).

Accordingly, by using the acoustic sensor 100, the home security system may be easily provided.

The communication unit 135 may exchange data with an external device.

For example, the communication unit 135 may transmit an acoustic signal, collected by the microphone 110, or data corresponding to the collected acoustic signal, to the external server 500 or the terminal.

Here, the acoustic signal, collected by the microphone 110, may be a failure acoustic signal of the home appliance 200, an operation acoustic signal of the home appliance 200, or a door opening or closing acoustic signal of the home appliance 200.

To this end, the communication unit 135 may perform ZigBee communication, WiFi communication, Bluetooth communication, and the like.

Particularly, the communication unit 135 may transmit location information of calculated touch input to the external server 500 or mobile terminal (not shown) via communication based on Bluetooth Low Energy (BLE) technology.

The memory 140 may store various types of data for the operation of the acoustic sensor 100.

For example, the memory 140 may store data corresponding to a failure acoustic signal of the home appliance 200, data corresponding to an operation acoustic signal of the home appliance 200, or data corresponding to a door opening or closing acoustic signal of the home appliance 200.

The sound output unit 147 may externally output an acoustic signal.

For example, the sound output unit 147 may externally output a sound received through the communication unit 135. Further, in the case where there is a thief in a building, the sound output unit 147 may output a sound corresponding to a warning message.

Alternatively, in the case where there is a need to replace a battery in the power supply 190 of the acoustic sensor 100, the sound output unit 100 may externally output a sound for battery replacement.

The power supply 190 may supply power to each unit in the acoustic sensor 100. To this end, the power supply 190 may be replaced, and may comprise a rechargeable battery.

The processor 170 may control the overall operation of the acoustic sensor 100.

In the case where an acoustic signal, collected by the microphone 110, corresponds to a failure acoustic signal of the home appliance 200, the processor 170 may transmit the collected acoustic signal, or data corresponding to the collected acoustic signal, to the external server 500 or the terminal. Accordingly, failure of the home appliance may be easily diagnosed, thereby improving user convenience in using the home appliance.

In the case where an acoustic signal, collected by the microphone 110, corresponds to the failure acoustic signal of the home appliance 200, the processor 170 may determine that the home appliance 200 has broken down, based on the failure acoustic signal of the home appliance 200.

Further, in the case where an acoustic signal, collected by the microphone 110, corresponds to an operation acoustic signal of the home appliance 200, the processor 170 may transmit the collected acoustic signal, or data corresponding to the collected acoustic signal, to the external server 500 or the terminal.

Moreover, in the case where an acoustic signal, collected by the microphone 110, corresponds to an operation acoustic signal of the home appliance 200, the processor 170 may determine an operation state based on the operation acoustic signal of the home appliance 200.

Further, in the case where the door of the home appliance 200 is opened or closed while the acoustic sensor 100 is attached to the home appliance 200, the processor 170 may transmit a door opening or closing acoustic signal collected by the microphone 110, or data corresponding to the door opening or closing acoustic signal, to the external server 500 or the terminal In addition, in the case where the acoustic signal, collected by the microphone 110, corresponds to the door opening or closing acoustic signal of the home appliance 200, the processor 170 determines opening or closing of the door of the home appliance 200 based on the door opening or closing acoustic signal.

Further, in the case where an acoustic signal, indicating an operation mode input for a specific home appliance 200, is input through the microphone 110, the processor 170 may enter an operation mode for the home appliance 200.

In the case where the acoustic signal, collected by the microphone 110, is at a reference level or higher, the processor 170 may activate the sensor unit 120, which is in an inactive state, thereby reducing power consumption.

Further, in the case where a moving object is detected based on the output infrared light, output from the sensor unit 120, and the received infrared light, received by the sensor unit 120, the processor 170 may transmit a warning signal to the external server 500 or to the terminal. In this manner, unmanned security may be provided using the acoustic sensor 100.

Moreover, the processor 170 may output sound, received through the communication unit 135, through the sound output unit.

Figure 5:
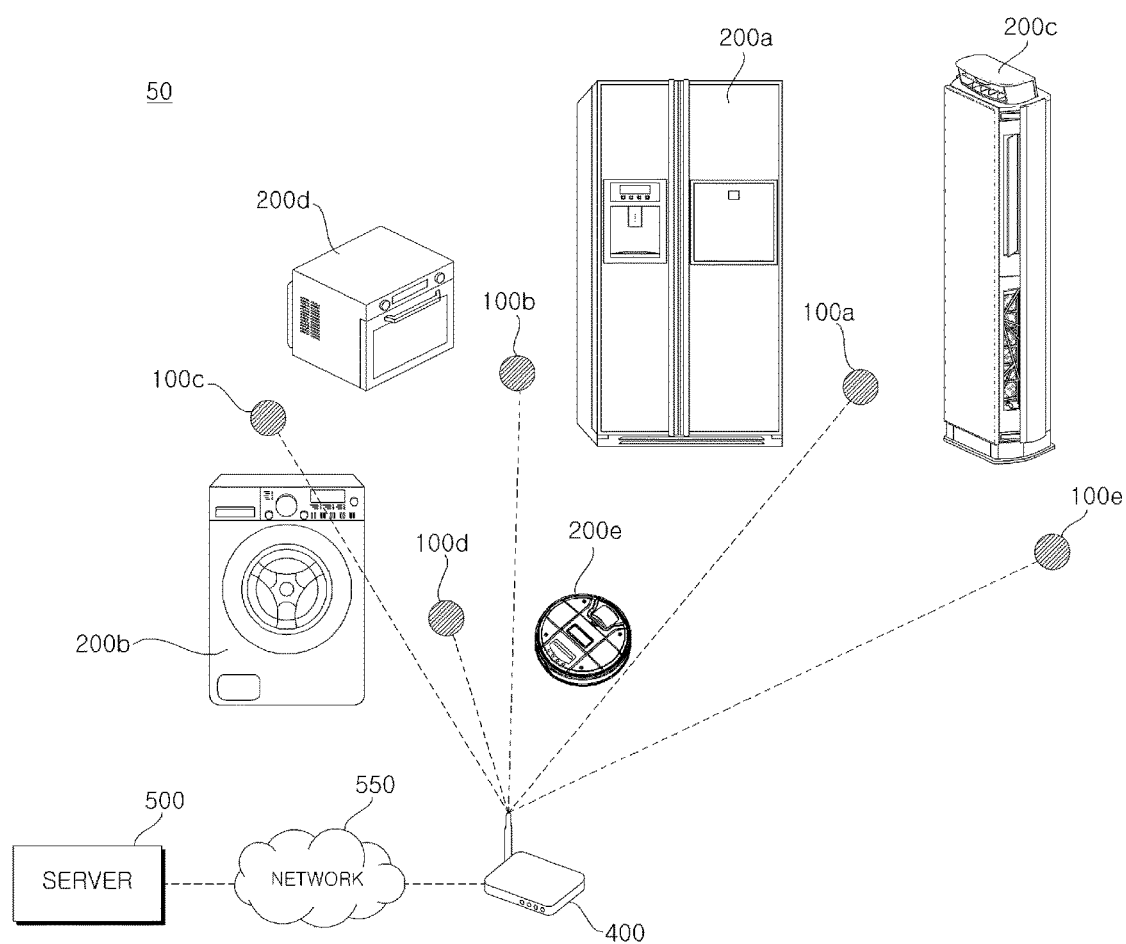
FIG. 5 is a diagram illustrating an example of arrangement of home appliances and acoustic sensors installed in the home appliance system illustrated in FIG. 1.

FIG. 5 is a diagram illustrating an example of arrangement of home appliances and acoustic sensors installed in the home appliance system illustrated in FIG. 1.

Referring to FIG. 5, a plurality of home appliances and a plurality of acoustic sensors may be disposed in a home appliance system 50.

FIG. 5 illustrates an example where the refrigerator 200a, the washing machine 200b, the air conditioner 200c, the cooking device 200d, and the cleaner 200e are spaced apart from each other, and a plurality of acoustic sensors 100a to 100e are respectively interposed therebetween.

Specifically, a first acoustic sensor 100a and a second acoustic sensor 100b are disposed near the refrigerator 200a; a third acoustic sensor 100c and a fourth acoustic sensor 100d are disposed near the washing machine 200b; the first acoustic sensor 100a and a fifth acoustic sensor 100e are disposed near the air conditioner 200c; the second acoustic sensor 100b and the third acoustic sensor 100c are disposed near the cooking device 200d; and the fourth acoustic sensor 100d is disposed near the cleaner 200e.

Acoustic signals, collected by the acoustic sensors 100a to 100e, or data corresponding to the collected acoustic signals, may be transmitted to the server 500 through the AP device 400.

FIGS. 6A to 15D are reference diagrams explaining the operation of the acoustic sensors and a server illustrated in FIG. 5.

FIGS. 6A to 6E illustrate an example where failure acoustic signals, output from each home appliance, are transmitted to the server through the acoustic sensors.

Figure 6A:
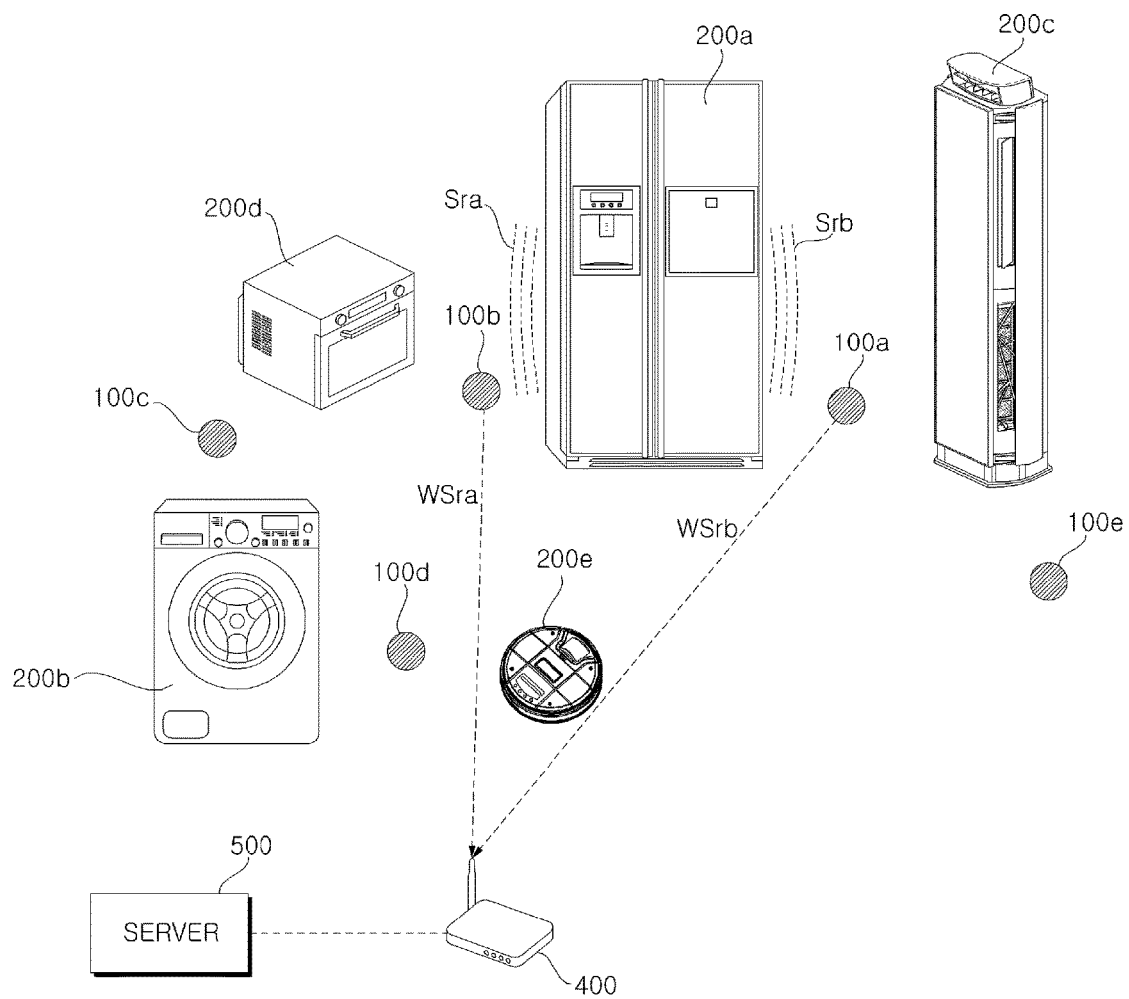
FIGS. 6A to 15D are reference diagrams explaining the operation of the acoustic sensors and a server illustrated in FIG. 5.

As illustrated in FIG. 6A, in the case where failure acoustic signals Sra and Srb are output from the refrigerator 200a, the first acoustic sensor 100a and the second acoustic sensor 100b, which are disposed near the refrigerator 200a, receive the failure acoustic signals Sra and Srb, and may transmit data WSra and WSrb, corresponding to the failure acoustic signals Sra and Srb, to the server 500 through the AP device 400.

Figure 6B:
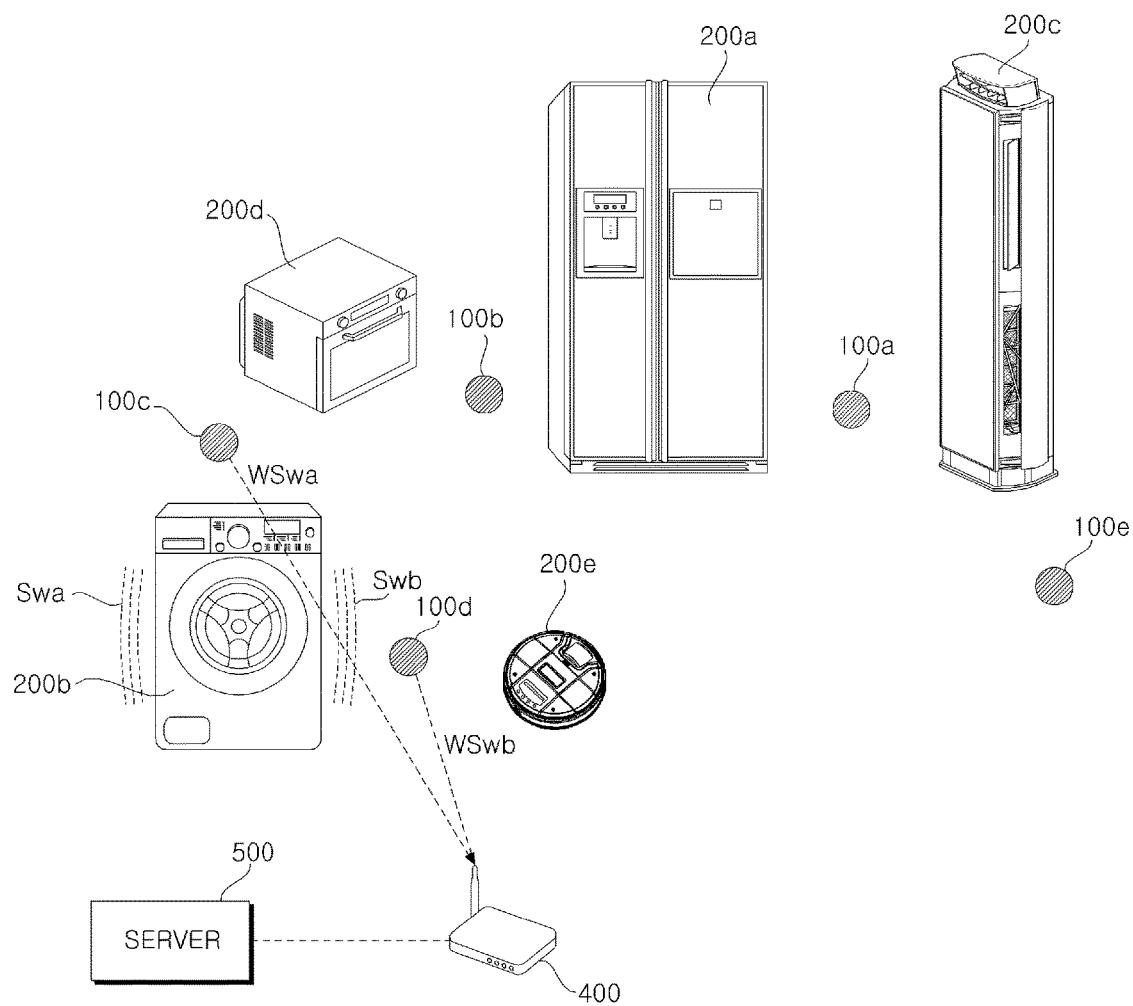

As illustrated in FIG. 6B, in the case where failure acoustic signals Swa and Swb are output from the washing machine 200b, the third acoustic sensor 100c and the fourth acoustic sensor 100d, which are disposed near the washing machine 200b, receive the failure acoustic signals Swa and Swb, and may transmit data WSwa and WSwb, corresponding to the failure acoustic signals Swa and Swb, to the server 500 through the AP device 400.

Figure 6C:
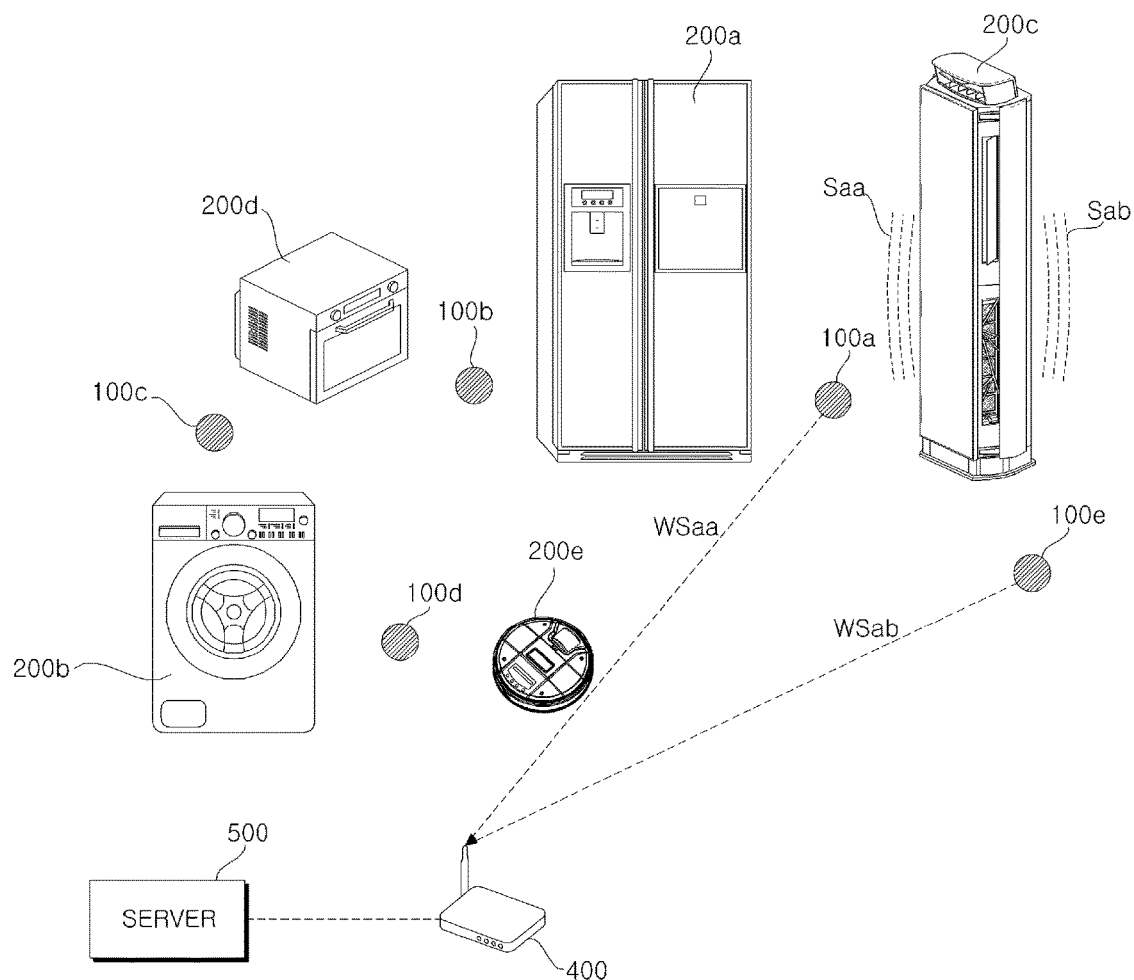

As illustrated in FIG. 6C, in the case where failure acoustic signals Saa and Sab are output from the air conditioner 200c, the first acoustic sensor 100a and the fifth acoustic sensor 100e, which are disposed near the air conditioner 200c, receive the failure acoustic signals Saa and Sab, and may transmit data WSaa and WSab, corresponding to the failure acoustic signals Saa and Sab, to the server 500 through the AP device 400.

Figure 6D:
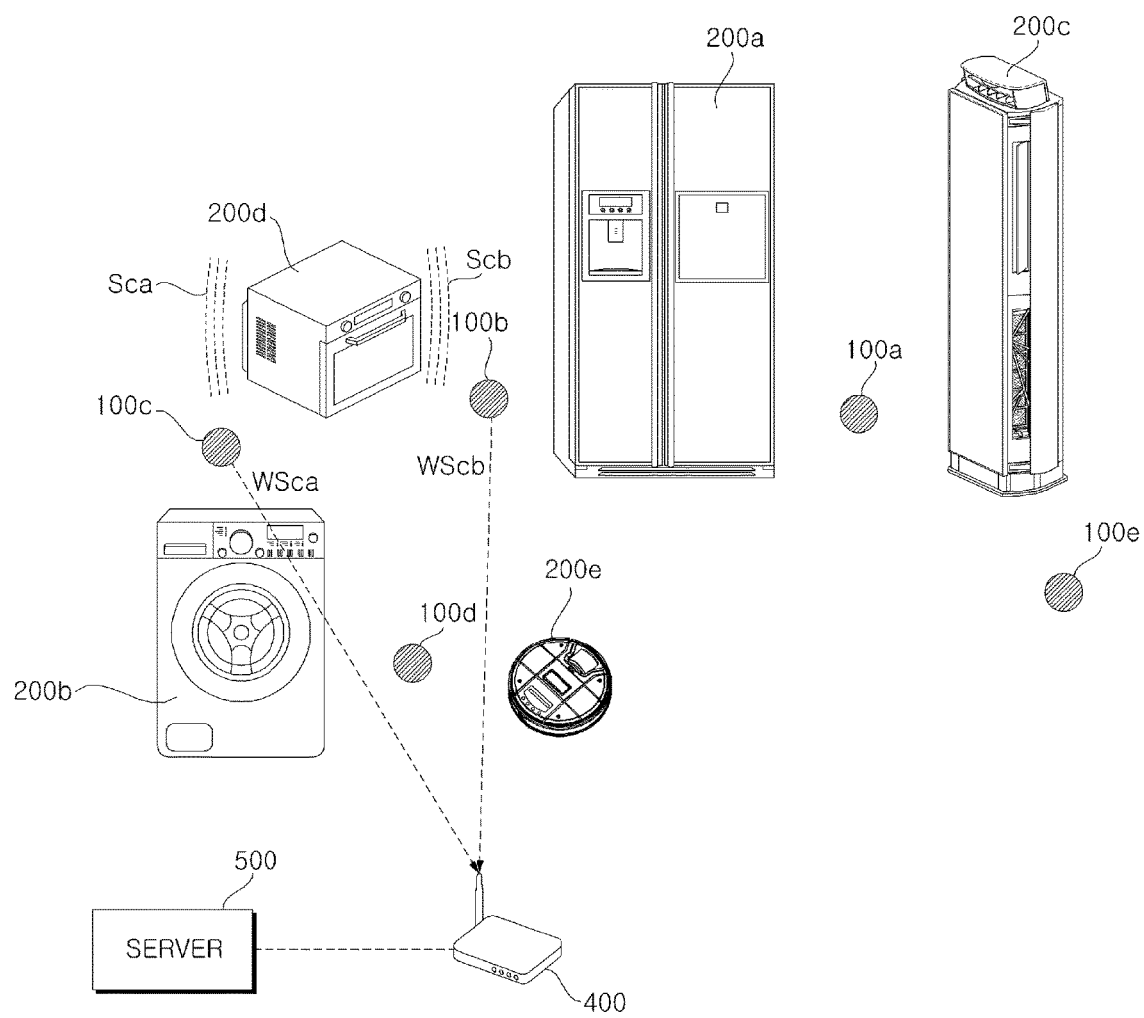

As illustrated in FIG. 6D, in the case where failure acoustic signals Sca and Scb are output from the cooking device 200d, the second acoustic sensor 100b and the third acoustic sensor 100c, which are disposed near the cooking device 200d, receive the failure acoustic signals Sca and Scb, and may transmit data WSca and WScb, corresponding to the failure acoustic signals Sca and Scb, to the server 500 through the AP device 400.

Figure 6E:
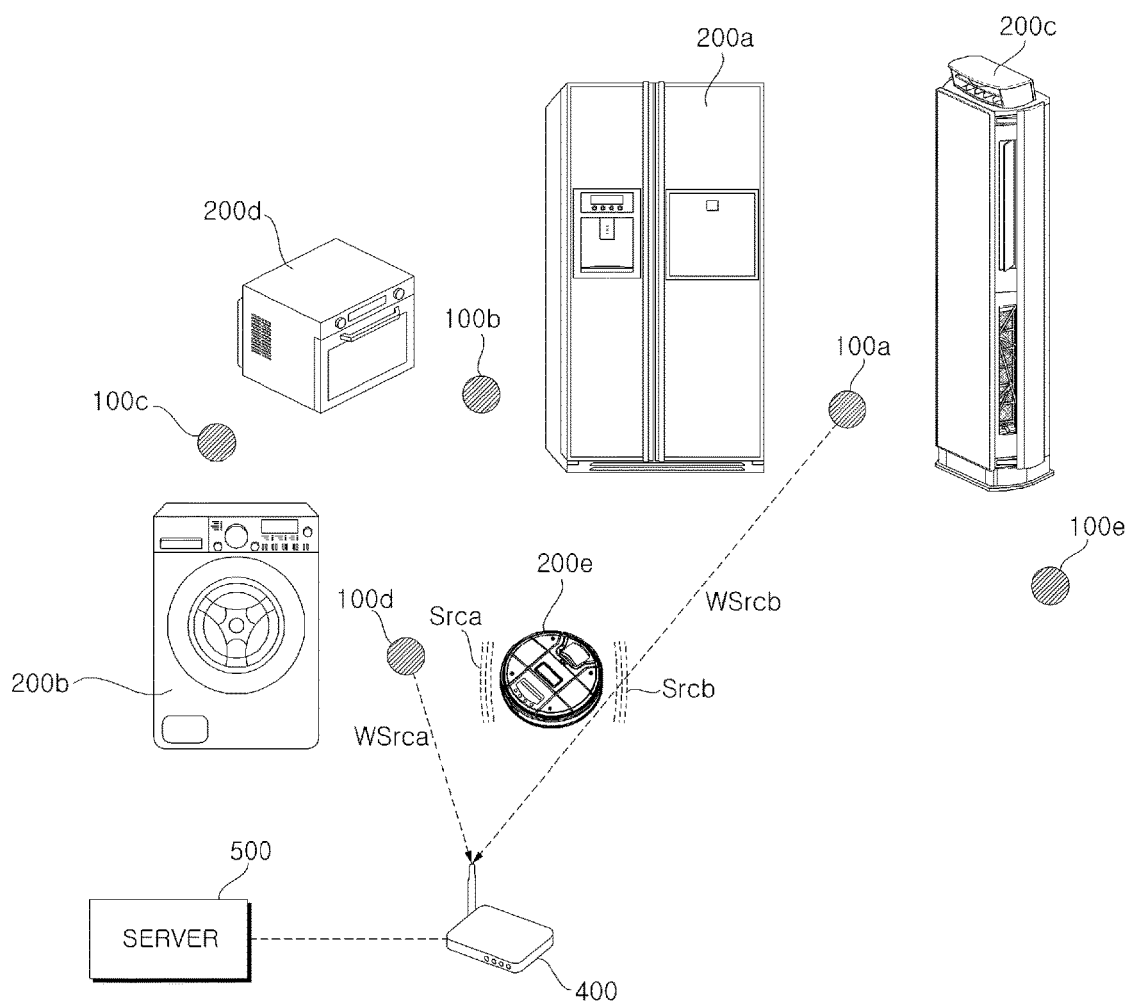

As illustrated in FIG. 6E, in the case where failure acoustic signals Srca and Srcb are output from the cleaner 200e, the first acoustic sensor 100a and the fourth acoustic sensor 100d, which are disposed near the air-conditioner 200c, receive the failure acoustic signals Srca and Srcb, and may transmit data WSrca and WSrcb, corresponding to the failure acoustic signals Srca and Srcb, to the server 500 through the AP device 400.

Accordingly, by using the plurality of acoustic sensors 100a to 100e, failure of the home appliances may be easily diagnosed.

In addition to diagnosis of failure, the acoustic sensor 100 may also be used in various applications. For example, the acoustic sensor 100 may be used to monitor an operation state of the home appliances, which will be described below with reference to FIG. 7A and the following figures.

Figure 7A:
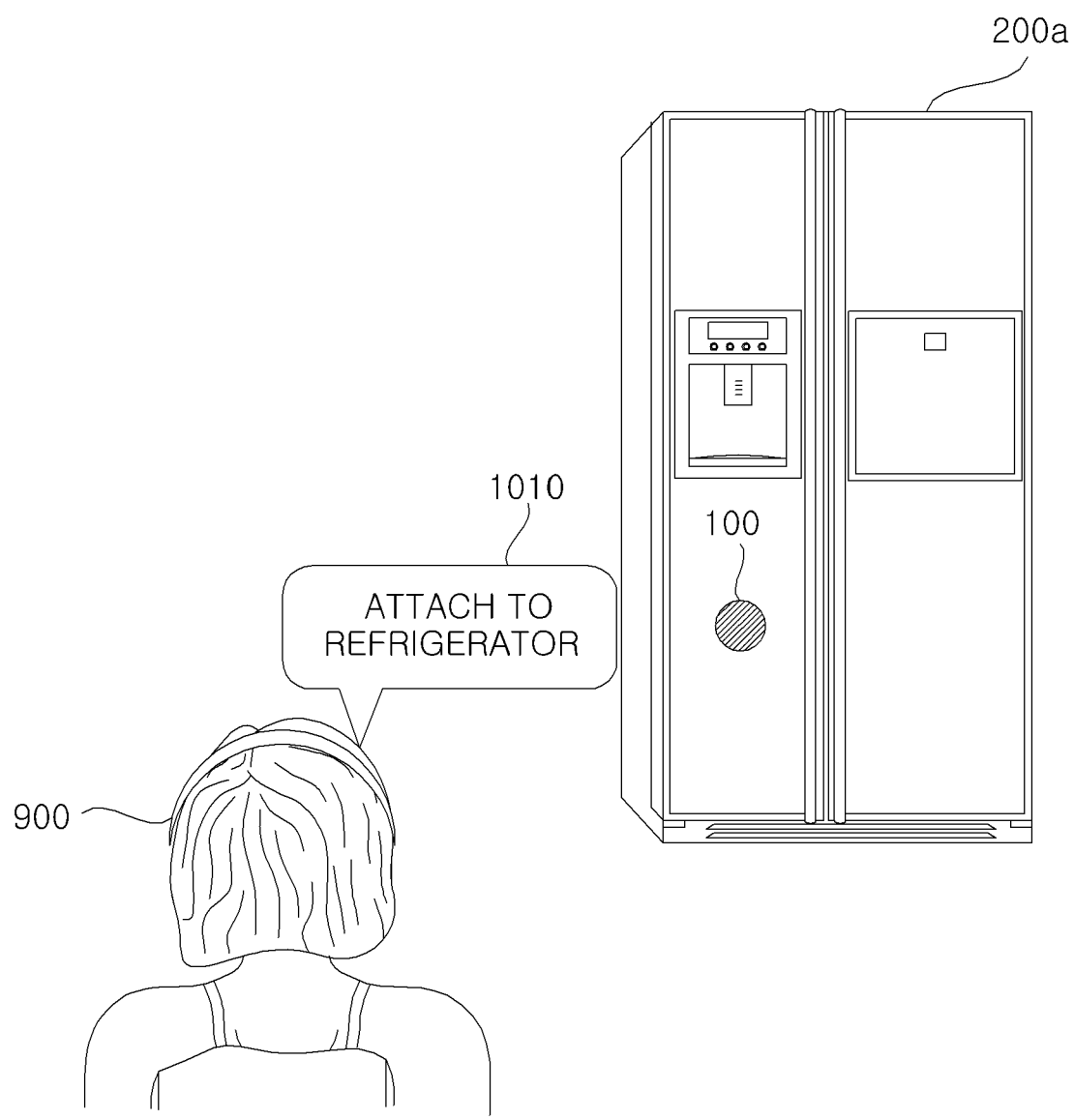

FIG. 7A illustrates an example where a user 900 inputs speech, "attach to the refrigerator", in front of the refrigerator 200a. In this manner, the acoustic sensor 100, which is attached to the refrigerator 200a, operates in a mode for the refrigerator 200a.

For example, in the case where the door of the refrigerator 200a is opened for an extended period of time, the acoustic sensor 100, which is attached to the refrigerator 200a, collects a warning sound output from the refrigerator 200a, and may transmit the collected warning sound to the server 500 and the like.

In another example, in the case where a notification sound, indicating that the shelf life of food stored in the refrigerator 200a has expired, the acoustic sensor 100 attached to the refrigerator 200a collects the notification sound, and may transmit the collected notification sound to the server 500 and the like.

Figure 7B:
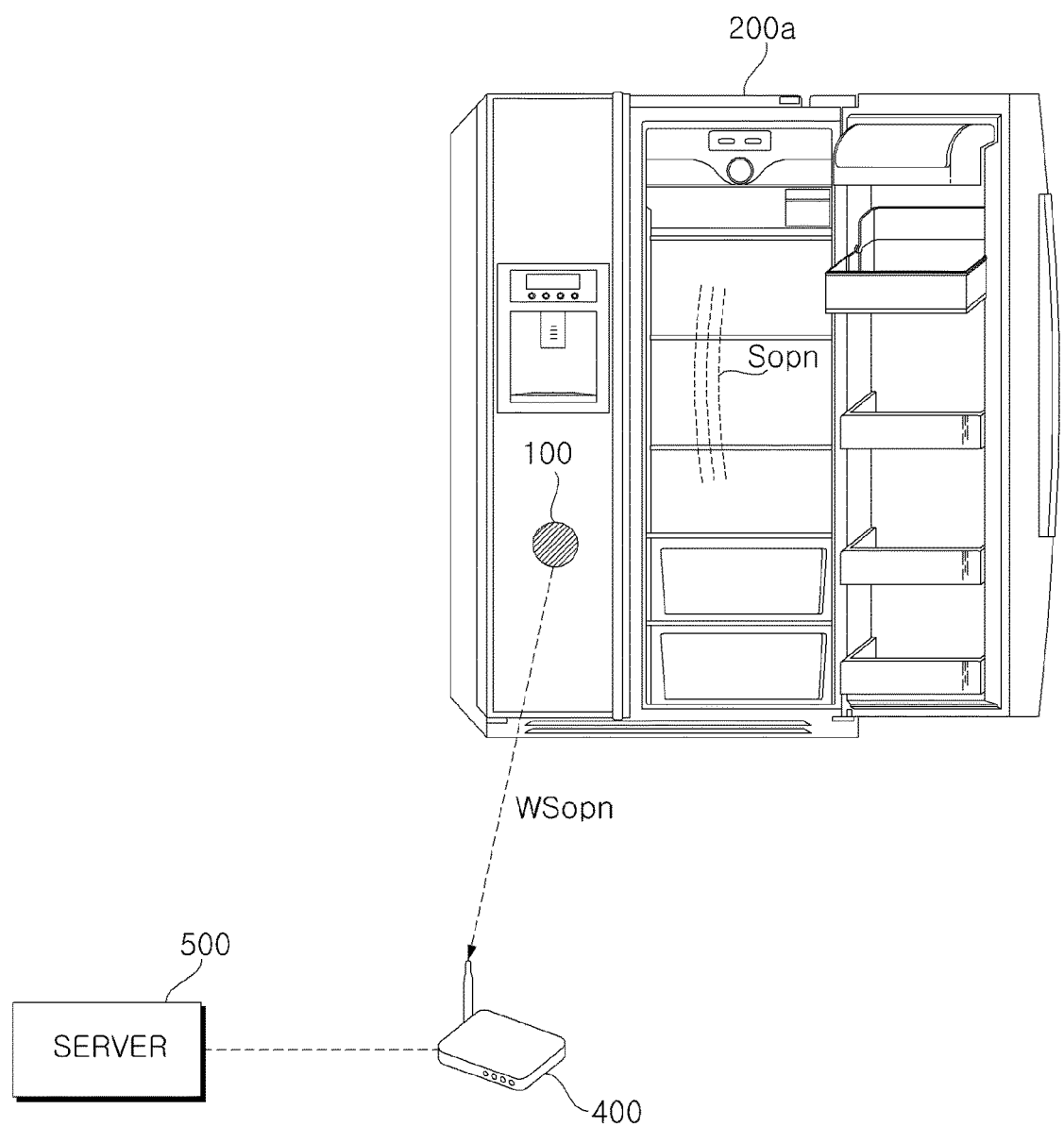

Further, as illustrated in FIG. 7B, the acoustic sensor 100 attached to the refrigerator 200a may collect a door opening acoustic signal Sopn, and may transmit the collected door opening acoustic signal Sopn to the server 500 and the like.

Figure 7C:
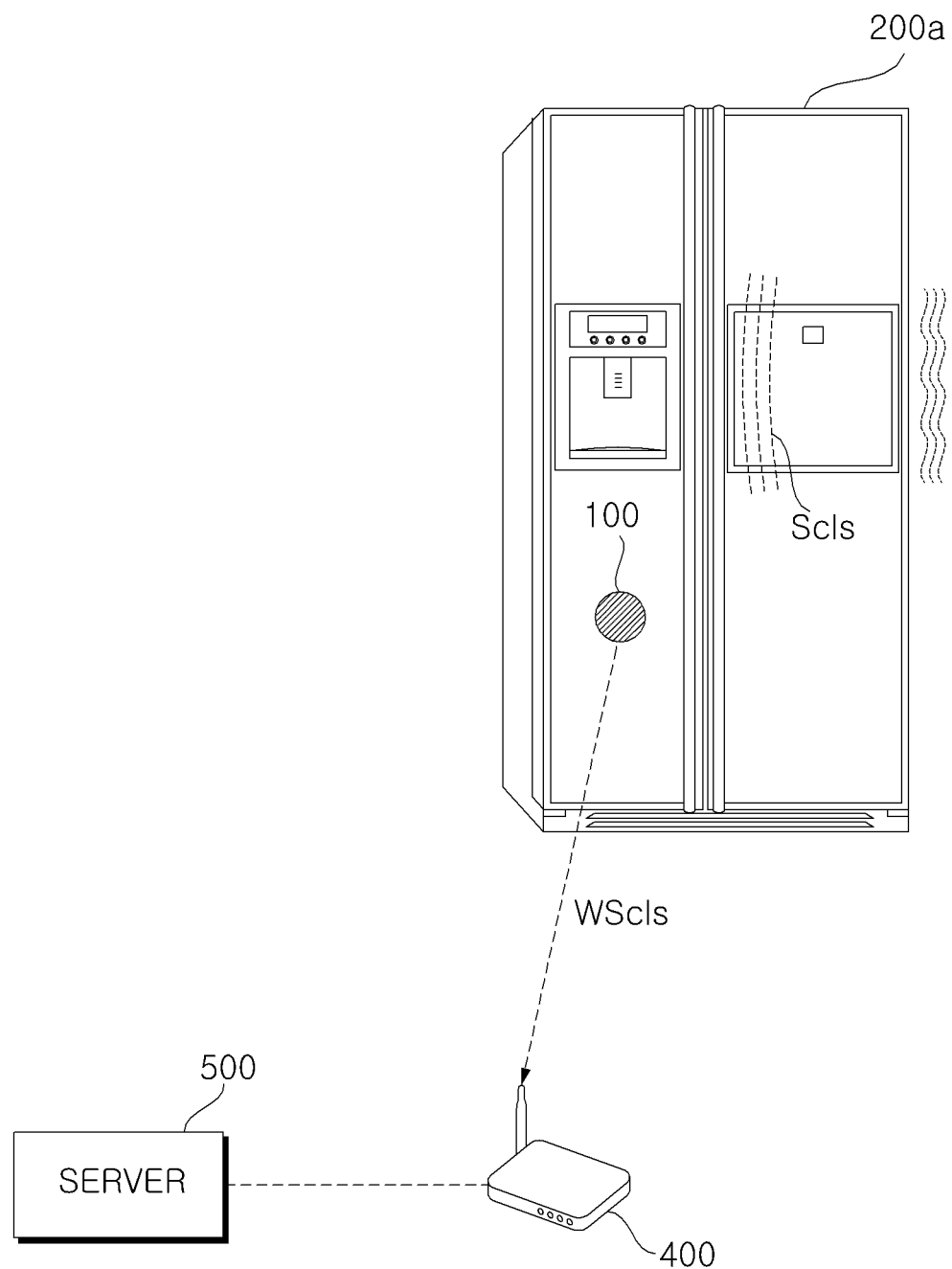

In addition, as illustrated in FIG. 7C, the acoustic sensor 100 attached to the refrigerator 200a may collect a door closing acoustic signal Scls, and may transmit the collected door closing acoustic signal Scls to the server 500 and the like.

Accordingly, opening or closing of the refrigerator 200a, or an operation state of the refrigerator 200a may be monitored through the server 500 or mobile terminal.

Figure 8A:
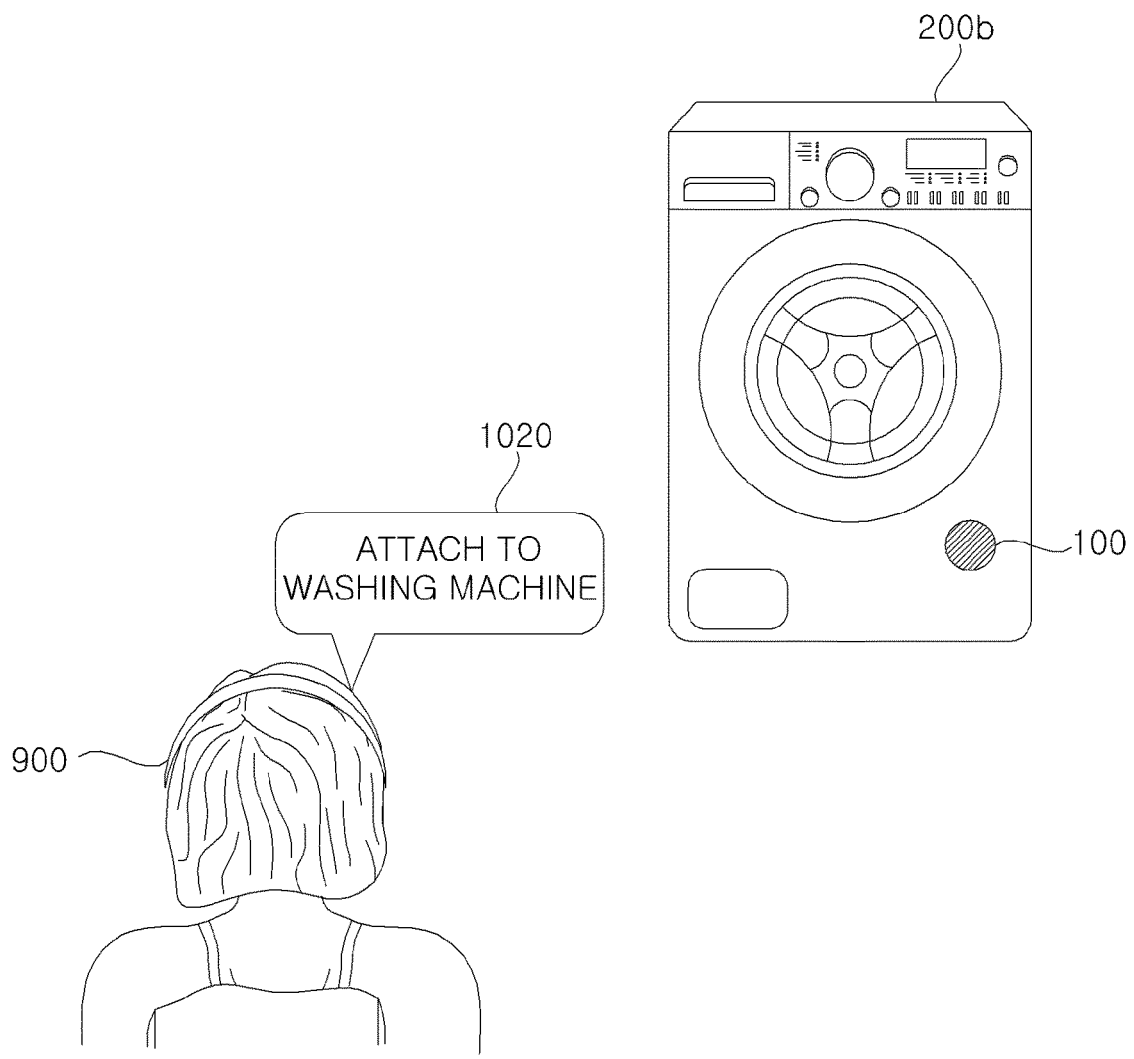

FIG. 8A illustrates an example where a user 900 inputs speech, "attach to the washing machine", in front of the washing machine 200b. In this manner, the acoustic sensor 100, which is attached to the washing machine 200b, operates in a mode for the washing machine 200b.

For example, the acoustic sensor 100 attached to the washing machine 200b may collect a warning sound, which is output from the washing machine 200b to indicate laundry is left in the machine, and may transmit the collected warning sound, indicating laundry is left, to the server 500 and the like.

Figure 8B:
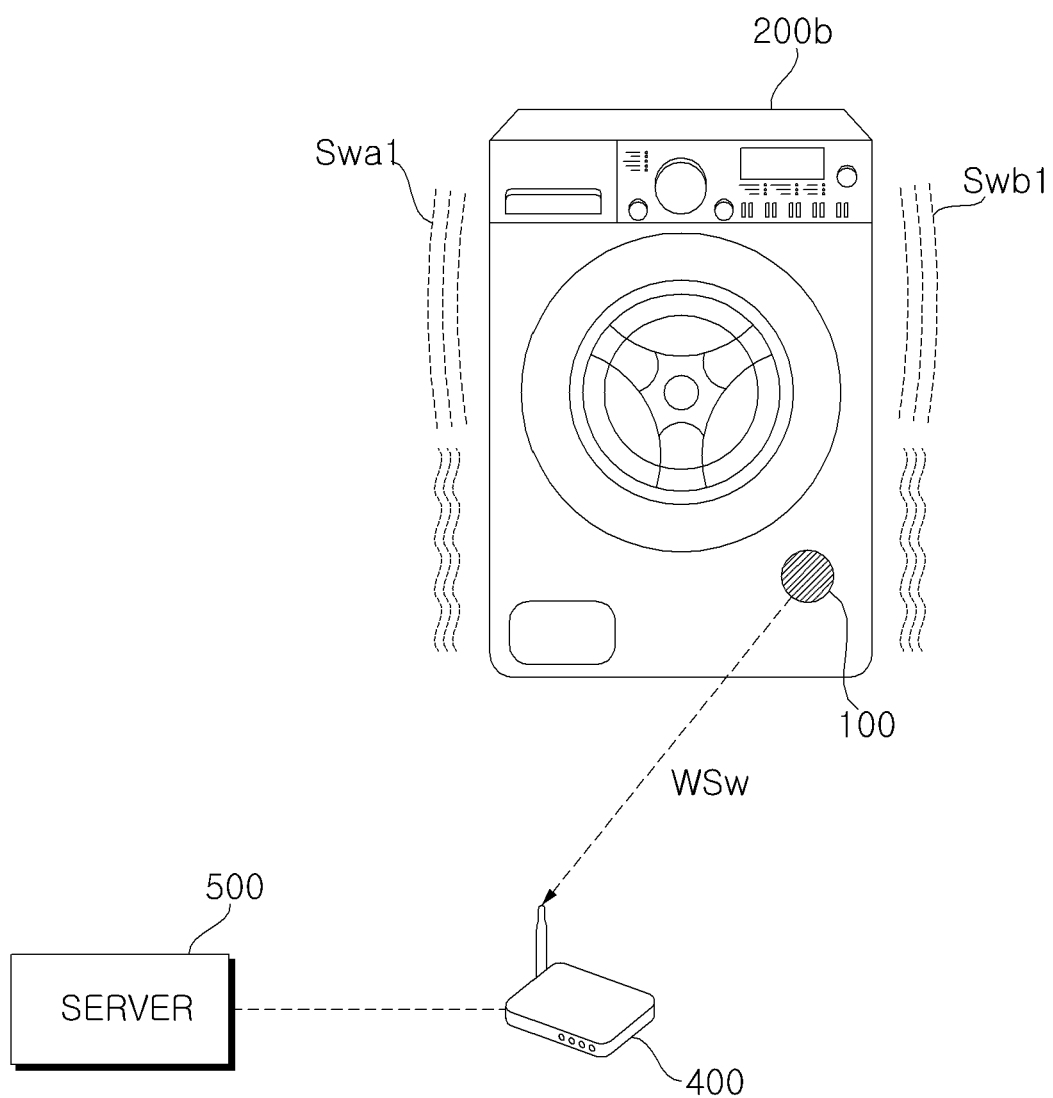

As illustrated in FIG. 8B, the acoustic sensor 100 attached to the washing machine 200b may collect vibrations of the washing machine 200b, an acoustic signal produced by the vibrations, or operation acoustic signals Swa1 and Swab1, and may transmit the collected vibrations or signals to the server 500 and the like.

Accordingly, the operation state of the washing machine 200b may be monitored through the server 500 or mobile terminal.

Figure 9A:
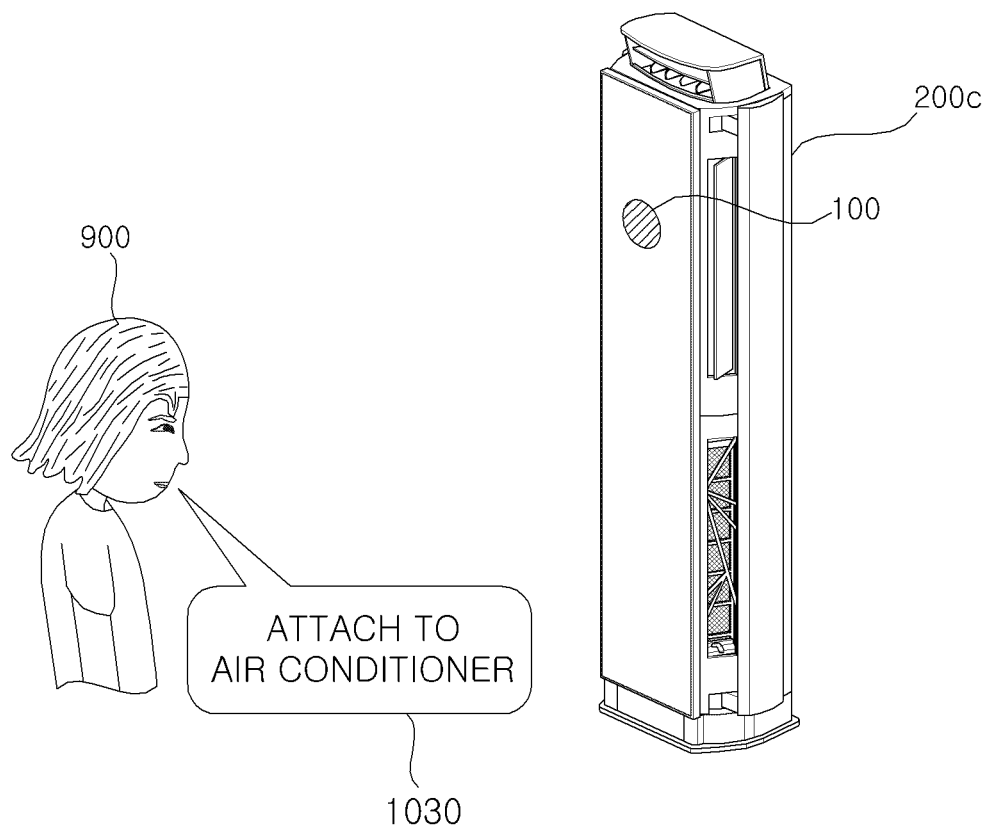

FIG. 9A illustrates an example where a user 900 inputs speech, "attach to the air conditioner", in front of the air conditioner 200c. In this manner, the acoustic sensor 100, which is attached to the air conditioner 200c, operates in a mode for the air conditioner 200c.

For example, in the case where a filter replacement notification sound is generated, the acoustic sensor 100 attached to the air conditioner 200c collects the filter replacement notification sound, and may transmit the collected filter replacement notification sound to the server 500 and the like.

Figure 9B:
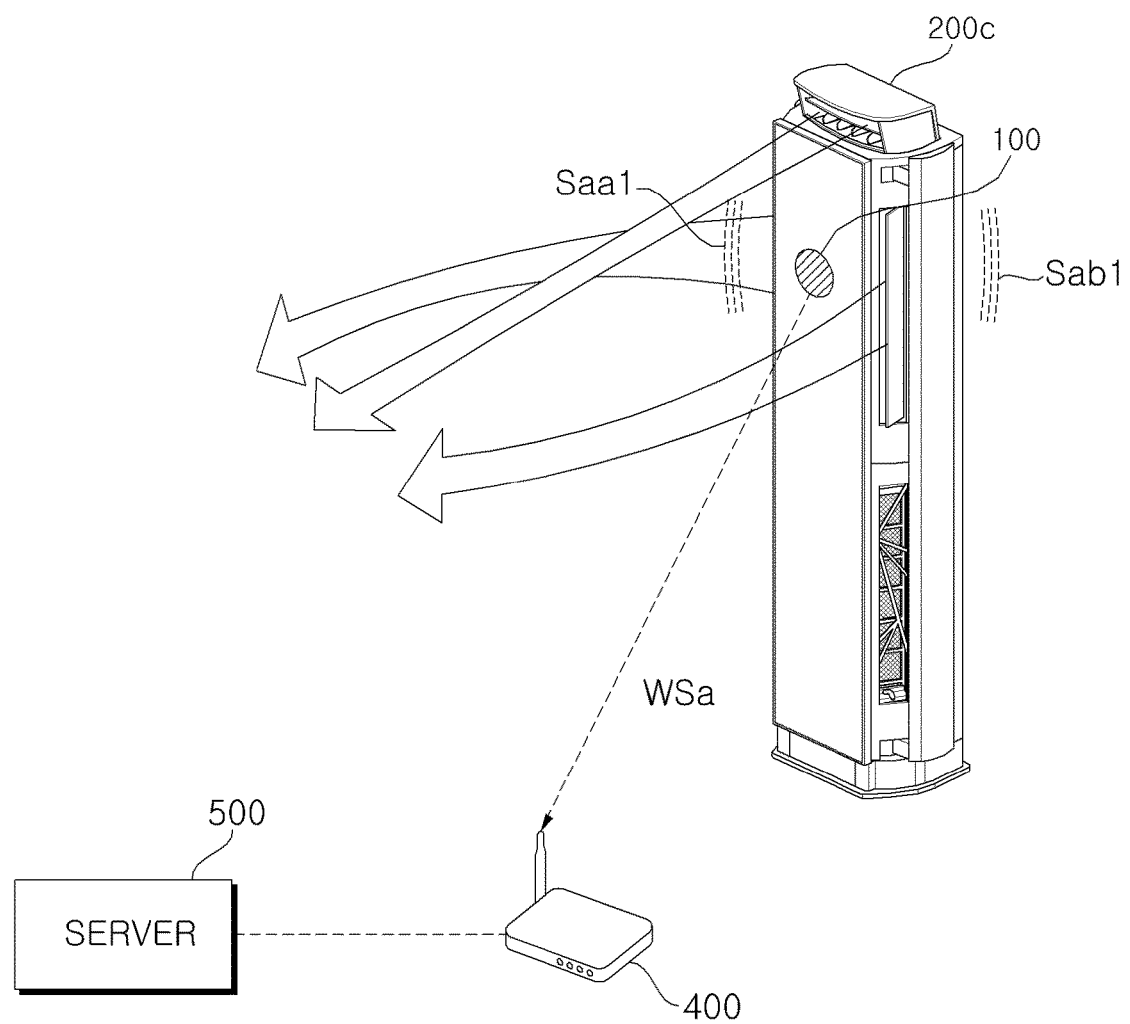

As illustrated in FIG. 9B, the acoustic sensor 100 attached to the air conditioner 200c may collect operation acoustic signals Saa1 and Saab1 of the air conditioner 200c, and may transmit the collected signals to the server 500 and the like.

Accordingly, the operation state of the air conditioner 200c may be monitored through the server 500 or mobile terminal.

Figure 10A:
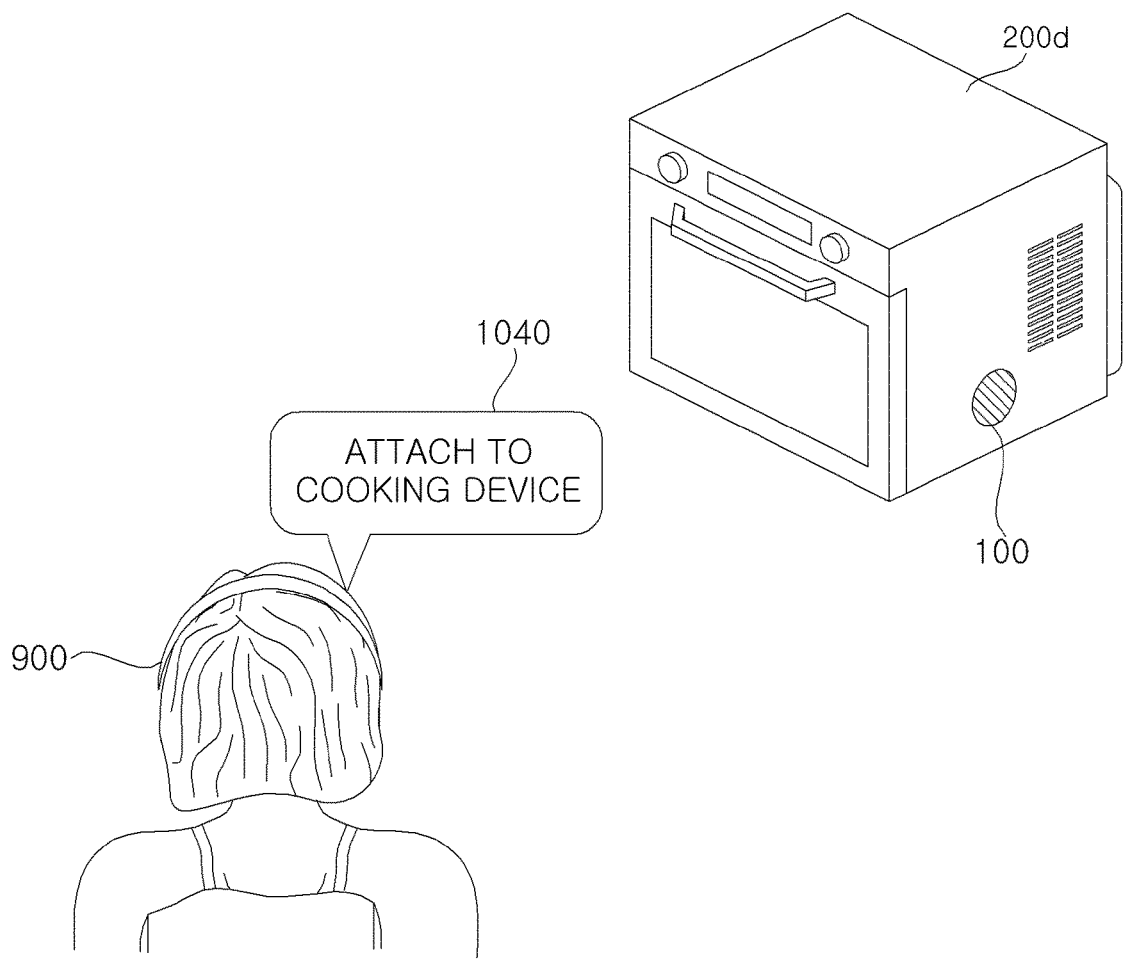
Figure 10B:
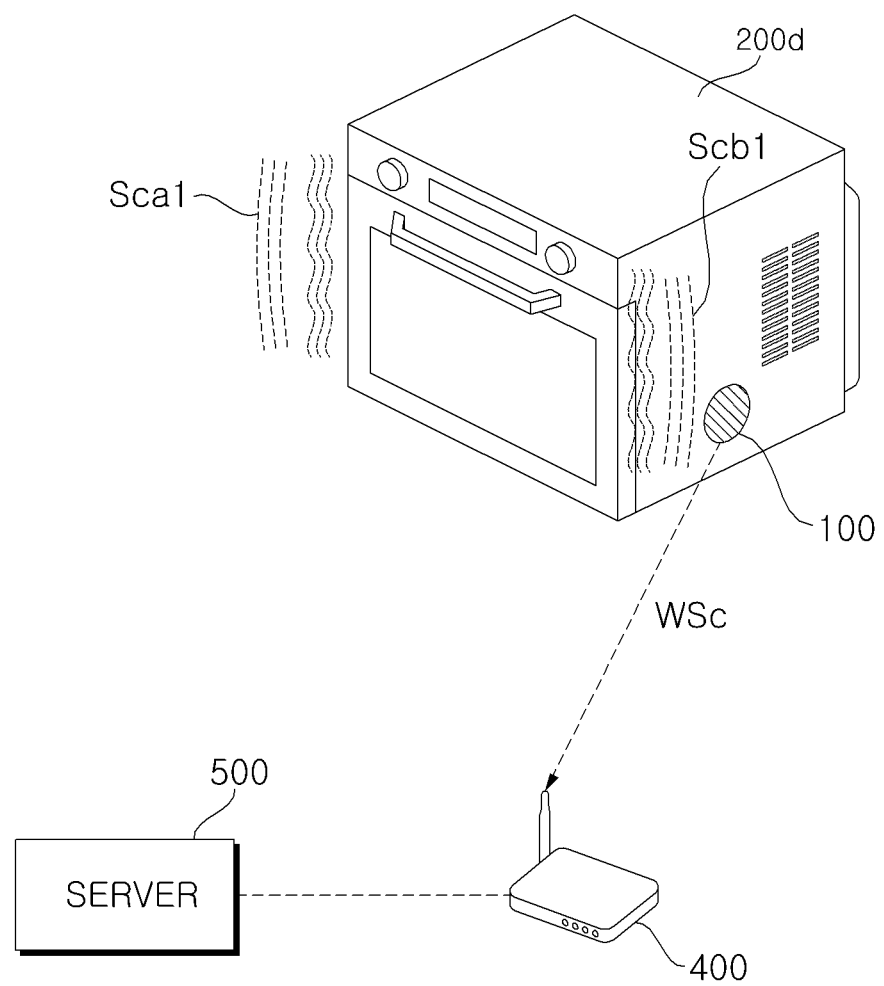

FIG. 10A illustrates an example where a user 900 inputs speech, "attach to the cooking device", in front of the cooking device 200d. In this manner, the acoustic sensor 100, which is attached to the cooking device 200d, operates in a mode for the cooking device 200d.

For example, the acoustic sensor 100 attached to the cooking device 200d may collect an operation completion sound of the cooking device 200d, and may transmit the collected operation completion notification sound to the server 500 and the like.

Further, as illustrated in 10B, the acoustic sensor 100 attached to the cooking device 200d may collect operation acoustic signals Sca1 and Scb1 of the cooking device 200d, and may transmit the collected signals to the server 500 and the like.

Accordingly, the operation state of the cooking device 200d may be monitored through the server 500 or mobile terminal.

Figure 11A:
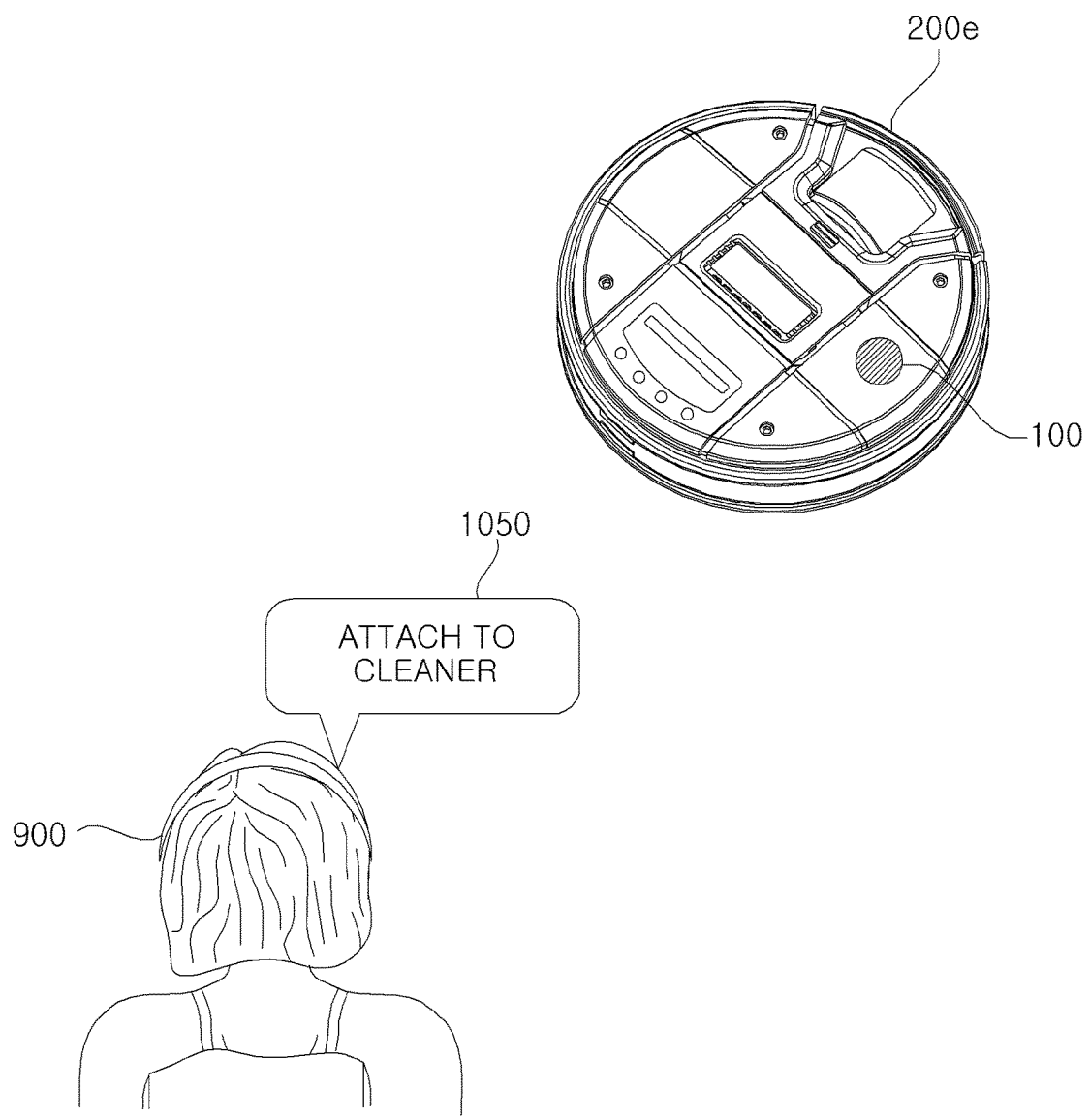

FIG. 11A illustrates an example where a user 900 inputs speech, "attach to the cleaner", in front of the cleaner 200e. In this manner, the acoustic sensor 100, which is attached to the cleaner 200e, operates in a mode for the cleaner 200e.

For example, the acoustic sensor 100 attached to the cleaner 200e may collect a battery replacement notification sound, a battery charging notification sound, and the like, and may transmit the collected sounds to the server 500 and the like.

Figure 11B:
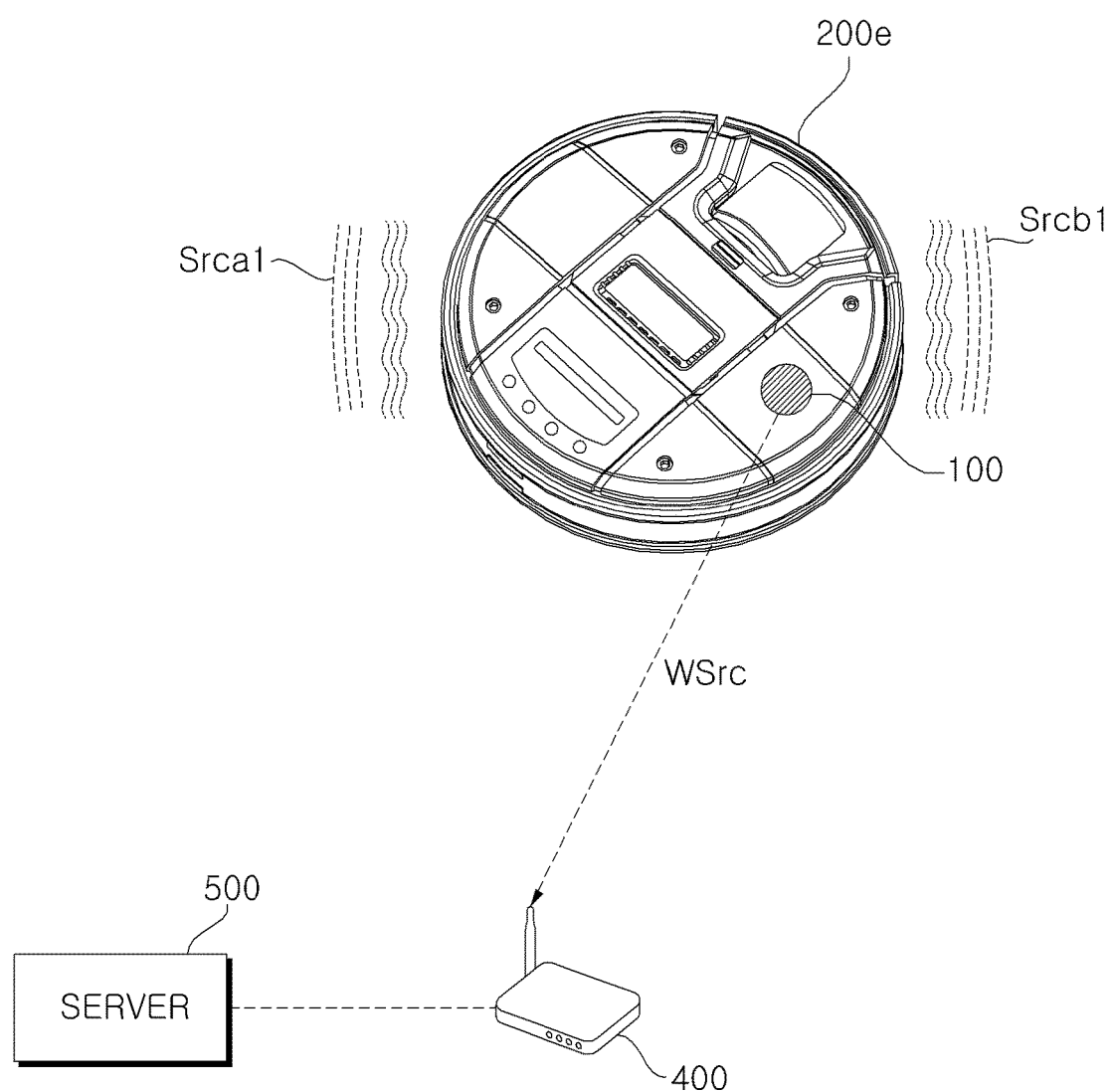

Further, as illustrated in FIG. 11B, the acoustic sensor 100 attached to the cleaner 200e may collect operation acoustic signals Scra1 and Scrb1 of the cleaner 200e, and may transmit the collected signals to the server 500 and the like.

Accordingly, the operation state of the cleaner 200e may be monitored through the server 500 or mobile terminal.

FIGS. 12A to 12E illustrate an example of an unmanned security mode using acoustic sensors.

Figure 12A:
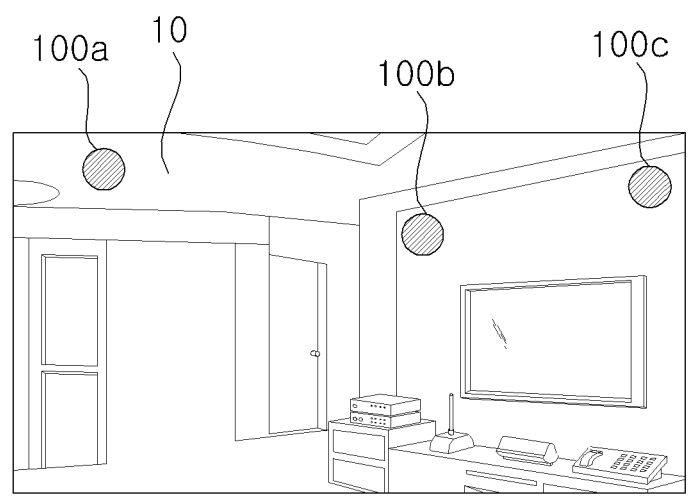

FIG. 12A illustrate an example where nobody is in a house 10.

Figure 12B:
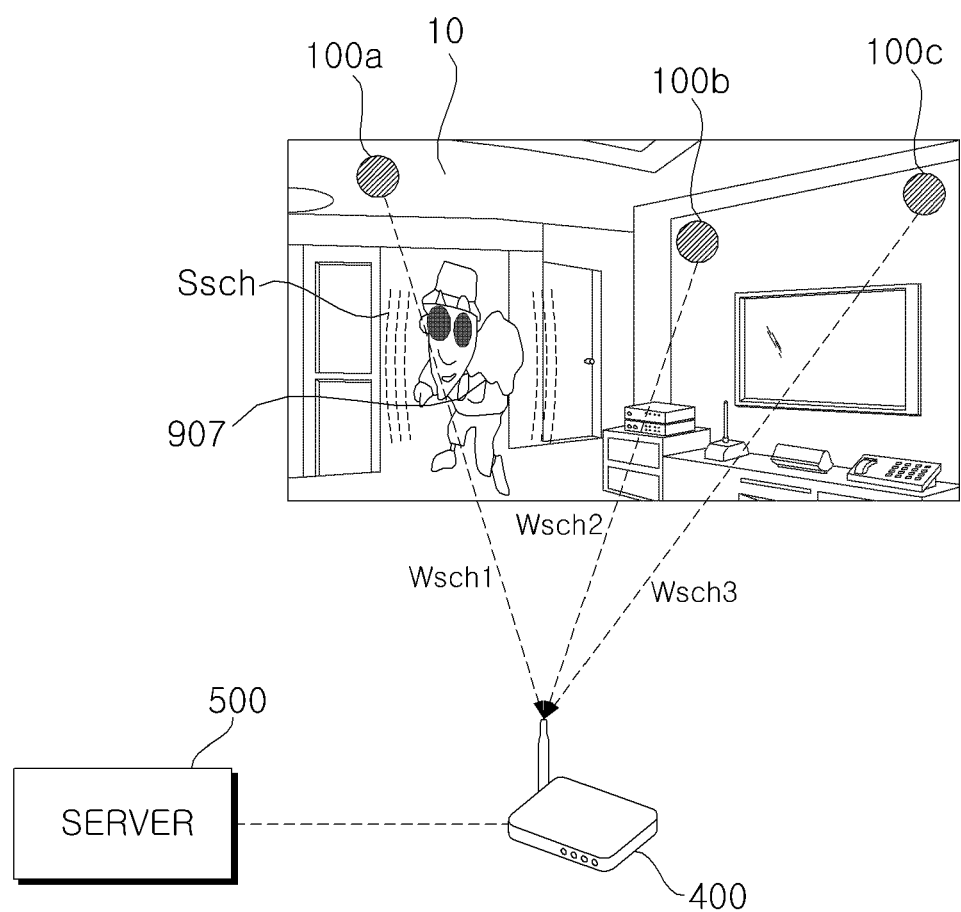
Figure 12C:
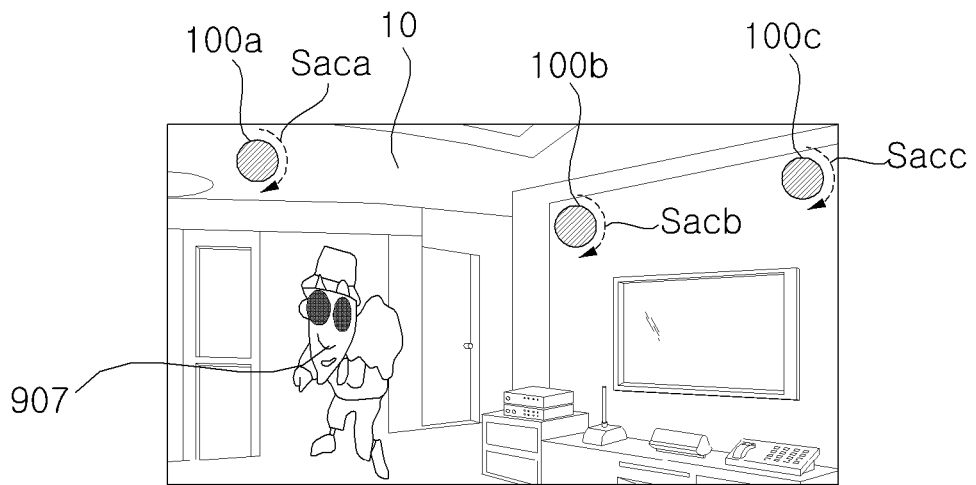

As illustrated in FIG. 12B, in the case where a thief 907 breaks into the house 10, the acoustic sensors 100a to 100c collect acoustic signals generated by the thief 907, and may transmit data Wsch1 to Wsch3, corresponding to the collected acoustic signals, to the server 500 through the AP device 400.

Accordingly, the server 500 may determine that the thief 907 has broken into the house 10.

In the case where the collected acoustic signal is at a reference level or higher, the acoustic sensors 100a to 100c may activate the sensor unit 120, which is in an inactive state, for more accurate determination.

That is, the acoustic sensors 100a to 100c may activate the sensor unit 120, which may output infrared light, by transmitting activation signals Saca, Sacb, and Sacc, respectively.

Figure 12D:
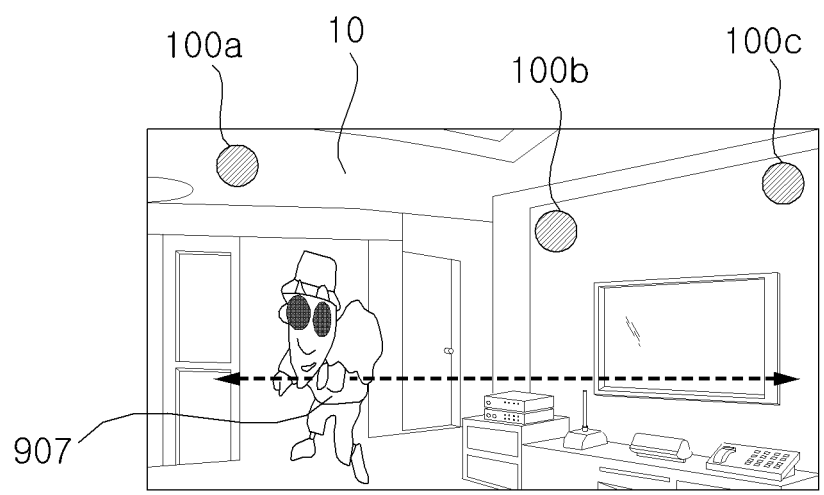
Figure 12E:
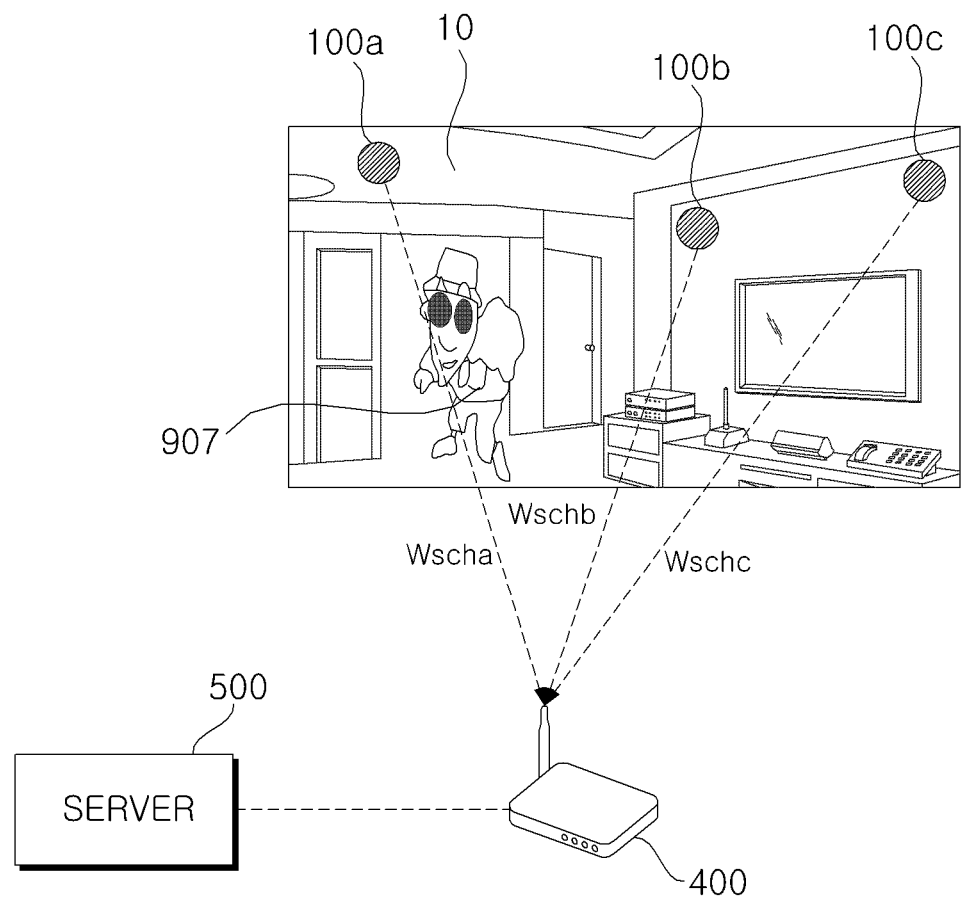

As illustrated in FIG. 12D, in the case where the thief 907 moves around in the house 10, the sensor unit 120 may transmit detection data WSaca, WSacb, and WSacc to the server 500 through the AP device 400, based on a phase difference between the output infrared light and the received infrared light.

Accordingly, the server 500 may determine that the thief 907 has broken into the house 10.

Further, in response to the determination that the thief 907 has broken into the house 10, the server 500 may transmit a warning signal to the acoustic sensors 100a to 100c, and the acoustic sensors 100a to 100c may output the received warning signal through the sound output unit.

Figure 13:
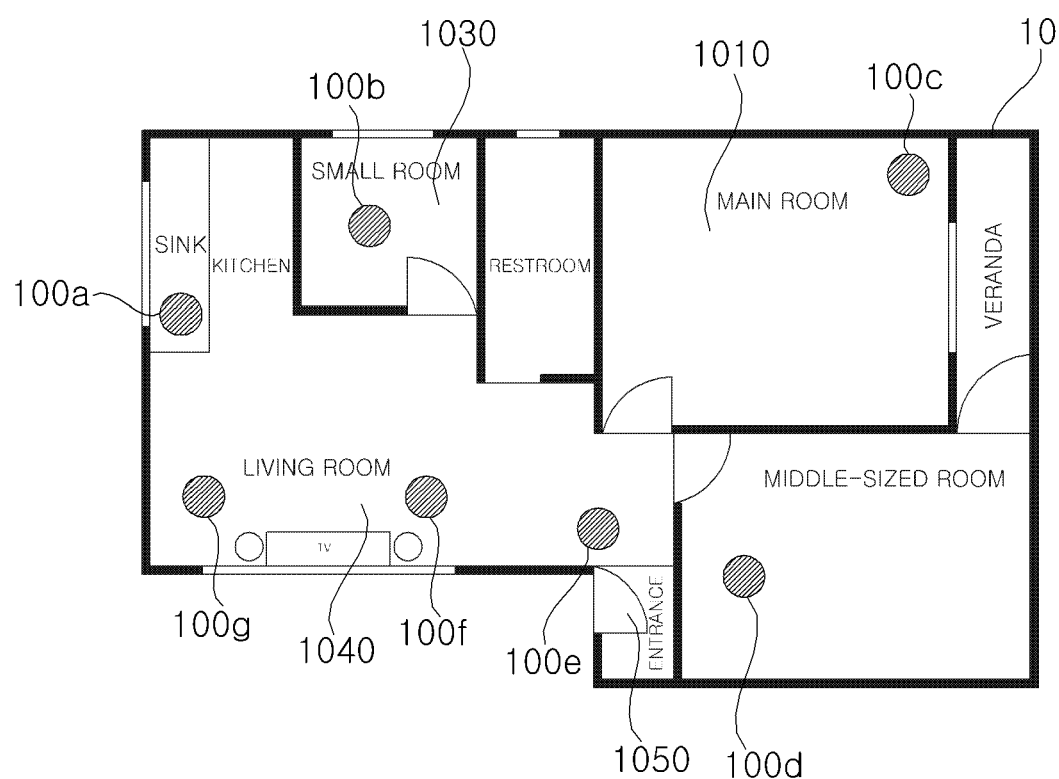

FIG. 13 is a diagram illustrating an example where a plurality of acoustic sensors are placed in the house.

As illustrated in FIG. 13, the plurality of acoustic sensors 100a to 100g may be positioned all over the house 10.

By using the acoustic sensors placed all over the house 10, baby care, child care, silver care, home care, care of electric power, and the like may be provided.

Figure 14:
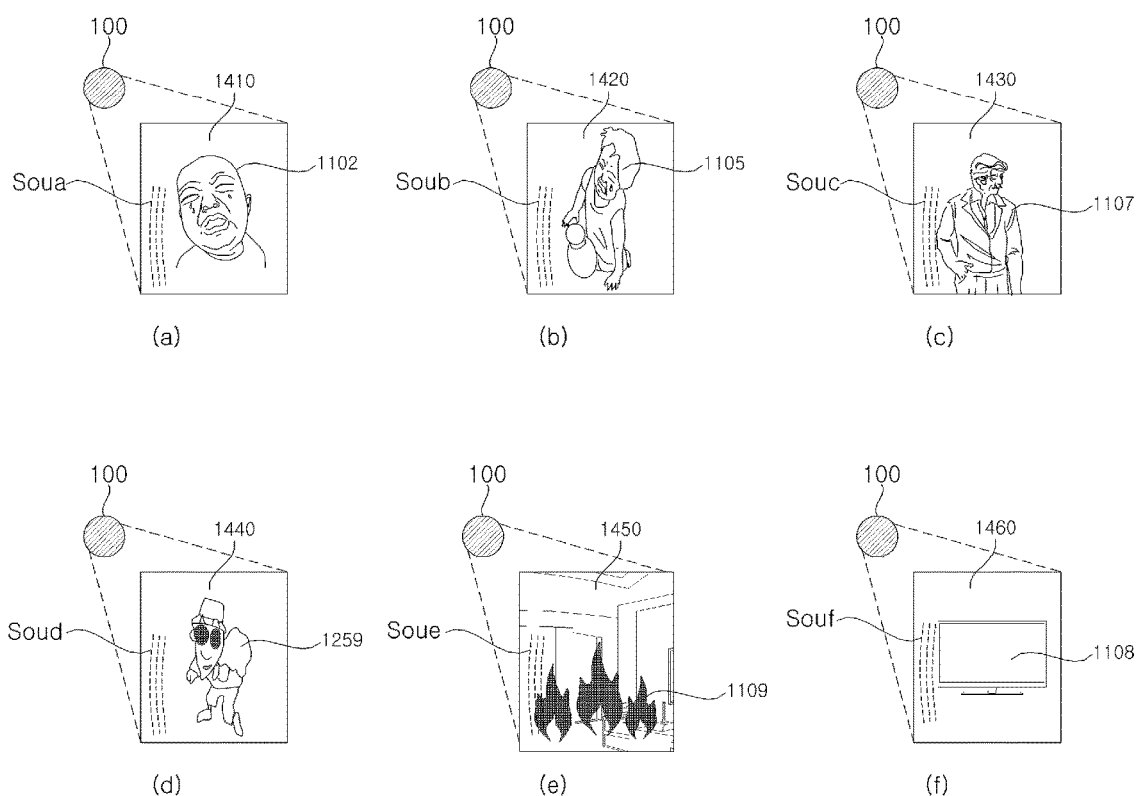

For example, when a baby 1102 is crying as illustrated in (a) of FIG. 14, the acoustic sensor 100 collects the crying sound, and may transmit the collected sound to the server 500 or the mobile terminal (not shown). Accordingly, it may be recognized by the server 500 or the mobile terminal (not shown) that the baby 1102 is crying, such that baby care may be provided.

In the case where a child 1105 is crying as illustrated in (b) of FIG. 14, the acoustic sensor 100 collects the crying sound, and may transmit the collected sound to the server 500 or the mobile terminal (not shown). Accordingly, it may be recognized by the server 500 or the mobile terminal (not shown) that the baby 1102 is crying, such that baby care may be provided.

Further, in the case where an elderly man 1107 collapsed as illustrated in (c) of FIG. 14, the acoustic sensor 100 collects the collapsing sound, and may transmit the collected sound to the server 500 or the mobile terminal (not shown). Accordingly, it may be recognized by the server 500 or the mobile terminal (not shown) that the elderly man 1107 collapsed at home, such that silver care may be provided.

In addition, in the case where a thief 1259 breaks in as illustrated in (d) of FIG. 14, the acoustic sensor 100 collects the sound of the thief, and may transmit the collected sound to the server 500 or the mobile terminal (not shown). Accordingly, it may be recognized by the server 500 or the mobile terminal (not shown) that the thief 1259 has broken into the house, such that home care may be provided.

Moreover, in the case where a fire 1450 breaks out as illustrated in (e) of FIG. 14, the acoustic sensor 100 collects the sound of fire, and may transmit the collected sound to the server 500 or the mobile terminal (not shown). Accordingly, it may be recognized by the server 500 or the mobile terminal (not shown) that a fire has broken out in the house.

Further, in the case where TV 1108 is turned on as illustrated in (f) of FIG. 14, the acoustic sensor 100 collects the sound of TV, and may transmit the collected sound to the server 500 or the mobile terminal (not shown). Accordingly, it may be recognized by the server 500 and the mobile terminal (not shown) that the TV 1108 is turned on in the house.

The acoustic sensor 100 may output the received sound through the sound output unit 147.

Figure 15A:

In the case where the baby 1102 is crying as illustrated in FIG. 15A, the acoustic sensor 100 may output, through the sound output unit 147, speech 1630 such as "Don't cry, my baby. Mommy will be right back", thereby soothing the crying baby 1102.

Figure 15B:

Further, in the case where the child 1105 is crying as illustrated in FIG. 15B, the acoustic sensor 100 may output, through the sound output unit 147, speech 1730 such as "Don't cry my daughter. Mommy will be right back", thereby soothing the crying child 1105.

Figure 15C:
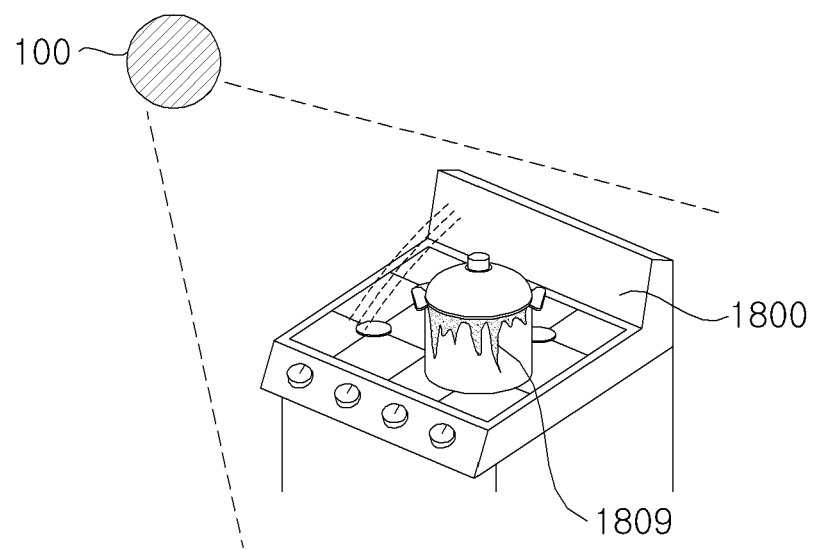

FIG. 15C illustrates an example where a cooking pot boils over during the operation of the cooking device 1800 which is a gas cooking device. The acoustic sensor 100 collects an acoustic signal of the boiling over, and may transmit the collected signal to the server 500 and the like.

Figure 15D:
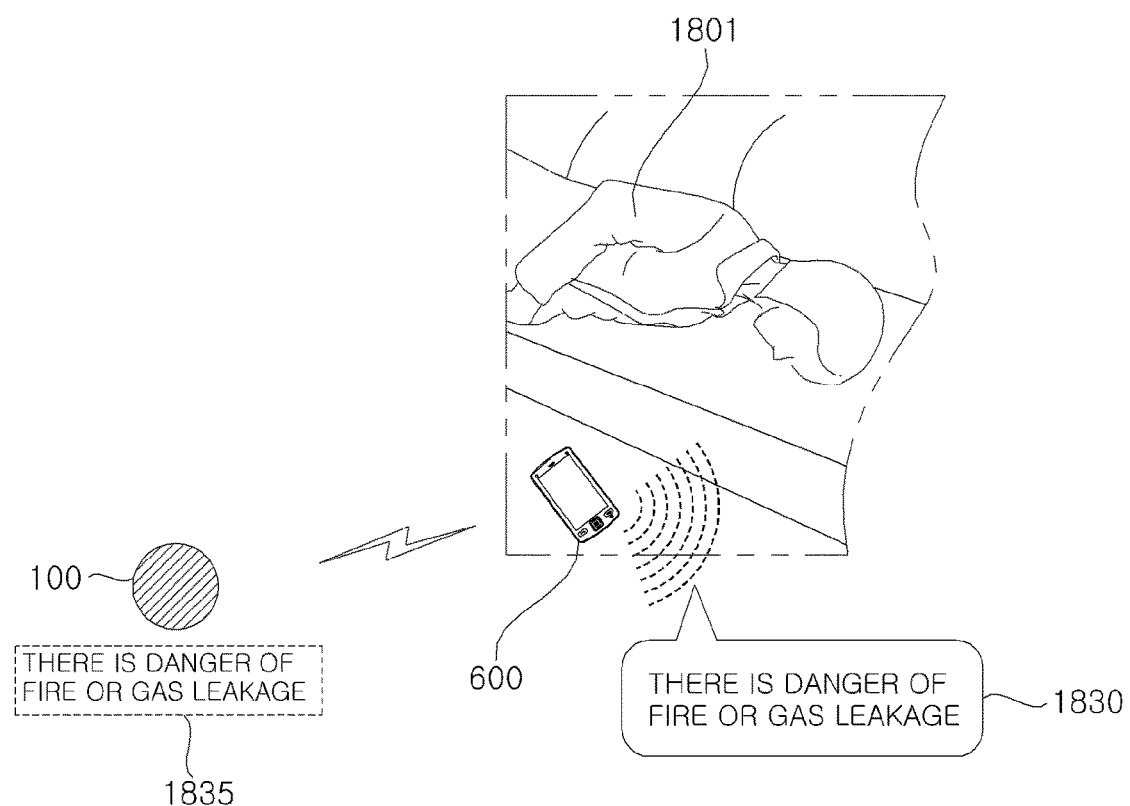

In addition, as illustrated in FIG. 15D, the acoustic sensor 100 may output, to the sound output unit 147, a notification message 1835, which is received from an external source or generated autonomously, to notify danger of fire outbreak or gas leakage.

The server 500 may transmit a message of danger notification to a mobile terminal and the like, and the mobile terminal 600 may output a notification message 1830, received from the server 500, to notify the danger of fire outbreak or gas leakage, such that home care may be provided by using the acoustic sensor 100.

As is apparent from the above description, the present invention has the following effects.

According to an exemplary embodiment of the present invention, the acoustic sensor comprises a communication unit, a microphone to collect an acoustic signal, a memory to store a failure acoustic signal of a home appliance, and a processor, wherein in response to the acoustic signal, collected by the microphone, corresponding to the failure acoustic signal of the home appliance, the processor transmits the collected acoustic signal, or data corresponding to the collected acoustic signal, to an external server or a terminal. Accordingly, by using the acoustic sensor, failure of the home appliance may be easily diagnosed.

In this manner, user convenience in using the home appliance may be improved.

Further, in response to the acoustic signal, collected by the microphone, corresponding to an operation acoustic signal of the home appliance, the acoustic sensor may transmit the collected acoustic signal, or data corresponding to the collected acoustic signal, to the external server or the terminal. Accordingly, an operation state of the home appliance may be easily identified.

In addition, in response to the acoustic signal, collected by the microphone, corresponding to a door opening or closing acoustic signal of the home appliance, the acoustic sensor may transmit the collected acoustic signal, or data corresponding to the door opening or closing acoustic signal, to the external server or the terminal. Accordingly, it may be easily identified whether the door of the home appliance is opened or closed.

The acoustic sensor may further comprise a sensor unit to output and receive infrared light, wherein in response to a moving object being detected, the acoustic sensor may transmit a warning signal to the external server or the terminal by using the sensor unit. In this manner, the acoustic sensor may be used as an unmanned security system in a building.

Further, in response to the acoustic signal, collected by the microphone, being at a reference level or higher, the acoustic sensor may activate the sensor unit which is in an inactive state, thereby reducing power consumption.

According to an exemplary embodiment of the present invention, the home appliance system comprises a home appliance, an acoustic sensor attached to the home appliance or disposed near the home appliance, and a server, wherein in response to a failure acoustic signal of the home appliance being collected by the acoustic sensor, the server receives the failure acoustic signal of the home appliance, or data corresponding to the failure acoustic signal of the home appliance, from the acoustic sensor. Accordingly, by using the acoustic sensor, failure of the home appliance may be easily diagnosed.

In this manner, user convenience in using the home appliance may be improved.

As described above, the acoustic sensors and the home appliance system comprising the same are not limited to the configuration and method of the above-described embodiments, and all or some of the above embodiments may be selectively combined with each other to enable various modifications thereof.

The operation methods of the terminal or the home appliance according to the present invention may be implemented as processor-readable code that can be written on a processor-readable recording medium comprised in the terminal or the home appliance. The processor-readable recording medium may be any type of recording device in which data is stored in a processor-readable manner. Examples of the processor-readable recording medium comprise a Read Only Memory (ROM), a Random Access Memory (RAM), a Compact Disk Read Only Memory (CD-ROM), a magnetic tape, a floppy disk, an optical data storage device, etc. In addition, the processor-readable recording medium may be a carrier wave, e.g., data transmission over the Internet. In addition, the processor-readable recording medium can be distributed over a plurality of computer systems connected to a network such that processor-readable code is written thereto and executed therefrom in a distribution manner.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

What is claimed is:

1. An acoustic sensor, comprising:
    a communication unit;
    a microphone to collect an acoustic signal;
    a sensor unit to output infrared light and receive light corresponding to the output infrared light;
    a memory to store a failure acoustic signal of a home appliance; and
    a processor, wherein in response to the acoustic signal, collected by the microphone, corresponding to the failure acoustic signal of the home appliance, the processor transmits the collected acoustic signal, or data corresponding to the collected acoustic signal, to an external server or a terminal, wherein in response to the acoustic signal, collected by the microphone, being at a reference level or higher, the processor activates the sensor unit which is in an inactive state.

2. The acoustic sensor of claim 1, wherein in response to the acoustic signal, collected by the microphone, corresponding to the failure acoustic signal of the home appliance, the processor determines that the home appliance has broken down, based on the failure acoustic signal of the home appliance.

3. The acoustic sensor of claim 1, wherein in response to the acoustic signal, collected by the microphone, corresponding to an operation acoustic signal of the home appliance, the processor transmits the collected acoustic signal, or data corresponding to the collected acoustic signal, to the external server or the terminal.

4. The acoustic sensor of claim 3, wherein in response to the acoustic signal, collected by the microphone, corresponding to the operation acoustic signal of the home appliance, the processor determines an operation state of the home appliance based on the operation acoustic signal of the home appliance.

5. The acoustic sensor of claim 1, wherein when a door of the home appliance is opened or closed while the acoustic sensor is attached to the home appliance, the processor transmits a door opening or closing acoustic signal, collected by the microphone, or data corresponding to the door opening or closing acoustic signal, to the external server or the terminal.

6. The acoustic sensor of claim 5, wherein in response to the acoustic signal, collected by the microphone, corresponding to the door opening or closing acoustic signal of the home appliance, the processor determines opening or closing of the door of the home appliance based on the door opening or closing acoustic signal of the home appliance.

7. The acoustic sensor of claim 1, wherein in response to an acoustic signal, indicating an operation mode input for a home appliance, being input through the microphone, the processor enters the operation mode for the home appliance.

8. The acoustic sensor of claim 1, wherein in response to a moving object being detected, the processor transmits a warning signal to the external server or the terminal based on the output infrared light, which is output from the sensor unit, and the received infrared light which is received by the sensor unit.

9. The acoustic sensor of claim 1, further comprising a sound output unit, wherein the processor outputs a sound, received by the communication unit, through the sound output unit.

10. A home appliance system, comprising:
    a home appliance;
    an acoustic sensor attached to the home appliance or disposed near the home appliance; and
    a server, wherein in response to a failure acoustic signal of the home appliance being collected by the acoustic sensor, the server receives the failure acoustic signal of the home appliance, or data corresponding to the failure acoustic signal of the home appliance, from the acoustic sensor, wherein the acoustic sensor outputs infrared light and receives light corresponding to the output infrared light, wherein in response to an acoustic signal, collected by a microphone, being at a reference level or higher, the acoustic sensor activates the sensor which is in an inactive state.

11. The home appliance system of claim 10, wherein in response to the acoustic signal, collected by the acoustic sensor, corresponding to the failure acoustic signal of the home appliance, the server determines that the home appliance has broken down, based on the failure acoustic signal of the home appliance.

12. The home appliance system of claim 10, wherein in response to the acoustic signal, collected by the acoustic sensor, corresponding to an operation acoustic signal of the home appliance, the server receives the collected acoustic signal, or data corresponding to the collected acoustic signal, from the acoustic sensor.

13. The home appliance system of claim 12, wherein in response to the acoustic signal, collected by the acoustic sensor, corresponding to the operation acoustic signal of the home appliance, the server determines an operation state of the home appliance based on the operation acoustic signal of the home appliance.

14. The home appliance system of claim 10, wherein when a door of the home appliance is opened or closed while the acoustic sensor is attached to the home appliance, the server receives a door opening or closing acoustic signal, collected by the acoustic sensor, or data corresponding to the door opening or closing acoustic signal, from the acoustic sensor.

15. The home appliance system of claim 14, wherein in response to the acoustic signal, collected by the acoustic sensor, corresponding to the door opening or closing acoustic signal of the home appliance, the server determines opening or closing of the door of the home appliance based on the door opening or closing acoustic signal of the home appliance.

16. The home appliance system of claim 10, wherein in response to an acoustic signal, indicating an operation mode input for a home appliance, being input to the microphone of the acoustic sensor, the acoustic sensor enters the operation mode for the specific home appliance.

17. The home appliance system of claim 10, wherein in response to a moving object being detected, the server receives a warning signal from the acoustic sensor based on the output infrared light, which is output from the acoustic sensor, and the received infrared light, which is received by the acoustic sensor.

18. The home appliance system of claim 10, wherein the server transmits a sound to the acoustic sensor, wherein the acoustic sensor outputs the sound, received by the server, through a sound output unit of the acoustic sensor.

* * * * *